United States Patent
Kim et al.

(10) Patent No.: US 11,270,616 B2
(45) Date of Patent: Mar. 8, 2022

(54) DISPLAY APPARATUS AND METHOD OF CONTROLLING THE SAME

(71) Applicant: SAMSUNG ELECTRONICS CO., LTD., Suwon-si (KR)

(72) Inventors: Moonyoung Kim, Suwon-si (KR); Jeongil Kang, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 0 days.

(21) Appl. No.: 16/985,292

(22) Filed: Aug. 5, 2020

(65) Prior Publication Data
US 2021/0043126 A1    Feb. 11, 2021

(30) Foreign Application Priority Data

Aug. 7, 2019   (KR) .................. 10-2019-0096317

(51) Int. Cl.
*G09G 3/20*      (2006.01)
*G06F 3/02*      (2006.01)
(Continued)

(52) U.S. Cl.
CPC ................. *G09G 3/20* (2013.01); *G06F 3/02* (2013.01); *H02J 4/00* (2013.01); *G09G 2330/021* (2013.01); *G09G 2330/06* (2013.01); *G09G 2354/00* (2013.01); *H02M 1/42* (2013.01); *H02M 1/44* (2013.01)

(58) Field of Classification Search
CPC ...... G06F 13/4022; G06F 1/266; G06F 1/189; G06F 1/26; G06F 1/263; G09G 2330/021; G09G 2330/06; G09G 2354/00; G09G 3/20

See application file for complete search history.

(56) References Cited

U.S. PATENT DOCUMENTS

2006/0232133 A1   10/2006   Cha
2006/0290327 A1   12/2006   Lee
(Continued)

FOREIGN PATENT DOCUMENTS

KR   92-000093 B1   1/1992
KR   10-0630933 B1   10/2006
(Continued)

OTHER PUBLICATIONS

Communication dated Nov. 20, 2020, issued by the International Searching Authority in counterpart International Application No. PCT/KR2020/010119 (PCT/ISA/210 and 237).

*Primary Examiner* — Gerald Johnson
(74) *Attorney, Agent, or Firm* — Sughrue Mion, PLLC

(57) ABSTRACT

Disclosed are a display apparatus and a method of controlling the same, the display apparatus including: a display, a first connector connectable to a first power source, a second connector connectable to a second power source, a first converter configured to convert power supplied from the first power source, a second converter configured to supply operation power to the display based on power converted by the first converter or power supplied from the second power source, and a selector configured to connect the first connector and the first converter or the second connector and the second converter based on a power connection state of the first connector and the second connector.

22 Claims, 19 Drawing Sheets

(51) Int. Cl.
*H02J 4/00* (2006.01)
*H02M 1/44* (2007.01)
*H02M 1/42* (2007.01)

(56) References Cited

U.S. PATENT DOCUMENTS

| | | | | |
|---|---|---|---|---|
| 2009/0127935 | A1* | 5/2009 | Hung | H02J 7/0031 307/80 |
| 2012/0320283 | A1 | 12/2012 | Kinoshita et al. | |
| 2016/0291663 | A1* | 10/2016 | Sun | G06F 13/4022 |
| 2016/0322860 | A1* | 11/2016 | Wu | H02J 9/06 |

FOREIGN PATENT DOCUMENTS

| | | |
|---|---|---|
| KR | 10-0633163 B1 | 10/2006 |
| KR | 10-2016-0020099 A | 2/2016 |
| KR | 10-1857656 B1 | 5/2018 |
| WO | 2011/046645 A1 | 4/2011 |

* cited by examiner

DISPLAY APPARATUS AND METHOD OF CONTROLLING THE SAME

CROSS-REFERENCE TO RELATED THE APPLICATION

This application is based on and claims priority under 35 U.S.C. § 119 to Korean Patent Application No. 10-2019-0096317 filed on Aug. 7, 2019 in the Korean Intellectual Property Office, the disclosure of which is incorporated by reference herein in its entirety.

BACKGROUND

Field

Apparatuses and methods consistent with the exemplary embodiments relate to a display apparatus and a method of controlling the same, and more particularly to a display apparatus, in which input power is selectable, and a method of controlling the same.

Description of the Related Art

Display apparatuses, such as a television (TV) and the like, display content, which is received from an external image source or stored therein, to a user.

An in-home display apparatus is often installed to receive power through a wall socket, i.e. from a power source.

Meanwhile, a display apparatus may connect with a separate electronic apparatus, i.e. an appended apparatus for providing content to a display on which an image is displayed. In this case, the display may be configured to receive data and power from the electronic apparatus through a connection cable.

However, in some premises or houses where the wall socket for supplying power to the display apparatus is previously installed, a connection cable and the like may be exposed and spoil the beauty while the electronic apparatus separately provided in the display apparatus is being connected to the wall socket.

Further, in some houses, it may be difficult to make room for the electronic apparatus in addition to the display apparatus, and thus a consumer may not want the appended apparatus such as the electronic apparatus. According to preferences of a consumer, the display apparatus given in the form of connecting with the electronic apparatus may cause the consumer to be reluctant to make a purchase.

SUMMARY

According to an embodiment of the disclosure, a display apparatus includes: a display; a first connector connectable to a first power source; a second connector connectable to a second power source; a first converter configured to convert a first power supplied from the first power source; a second converter configured to supply operation power to the display based on power converted by the first converter or a second power supplied from the second power source; and a selector configured to connect the first connector and the first converter or the second connector and the second converter based on a power connection state of the first connector and the second connector.

The display apparatus may further include a first switch and a second switch configured to perform selective connection between the first connector and the first converter and between the second connector and the second converter, respectively.

The selector may control the first switch and the second switch not to connect the first connector and the first converter but to connect the second connector and the second converter based on a connection between the second connector and the second power source.

The selector may control the first switch and the second switch to operate with a predetermined period of time therebetween.

The selector may include: a power generator configured to generate voltage based on the connection between the second connector and the second power source; and an operator configured to control the first switch to be turned off and the second switch to be turned on based on the generation of the voltage.

The selector may control the first switch and the second switch not to connect the second connector and the second converter but to connect the first connector and the first converter based on a disconnection between the second connector and the second power source.

The selector may include: a detector configured to detect whether the second power of the second power source is lowered to a first level or below based on the disconnection between the second connector and the second power source; and an operator configured to control the second switch to be turned off and the first switch to be turned on based on the second power of the second power source being the first level or below.

Each of the first switch and the second switch may include a relay device.

The first power source may supply alternating current (AC) power, and the second power source may supply direct current (DC) power, and the second power of the second power source may be supplied from an electronic apparatus connected via the second connector.

According to an embodiment of the disclosure, a display apparatus includes: a display; a first connector connectable to a first power source; a second connector connectable to a second power source; a first converter configured to convert a first power supplied from the first power source; a second converter configured to supply operation power to the display based on power converted by the first converter or a second power supplied from the second power source; and a switch movable between a first contact point for connection with the first power source and a second contact point for connection with the second power source based on control of a user, and configured to perform selective connection between the first connector and the first converter or between the second connector and the second converter.

The switch may include an electrode connectable with the first contact point or the second contact point.

The switch may be movable along a sliding slit provided in a cover member forming an outer appearance of the display apparatus.

The switch may include magnets provided on and beneath a cover member forming an outer appearance of the display apparatus and arranged to face with each other, and be movable along a guide provided in the cover member.

According to an embodiment of the disclosure, there is provided a method of controlling a display apparatus having a first connector connectable with a first power source and a second connector connectable with a second power source, the method including connecting the second connector and the second power source, turning off a first switch for connection of the first connector based on the connection, the first switch being configured to selectively connect with the first power source and turning on a second switch for connection of the second connector, the second switch being configured to selectively connect with second power source.

The turning on the second switch may include turning on the second switch based on a lapse of a predetermined period of time after turning off the first switch.

The method may further include supplying operation power for the display apparatus, based on power supplied from the second power source.

The method may further include: disconnecting the second connector from the second power source; turning off the second switch for the connection of the second connector based on the disconnection; and turning on the first switch for the connection of the first connector.

The turning on the first switch may include turning on the first switch based on a lapse of a predetermined period of time after turning off the second switch.

The first power source may supply alternating current (AC) power, and the second power source may supply direct current (DC) power, the method may further include receiving the power of the second power source from an electronic apparatus connected via the second connector.

The method may further include: converting power supplied from the first power source into the DC power; and supplying operation power for the display apparatus, based on the DC power.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
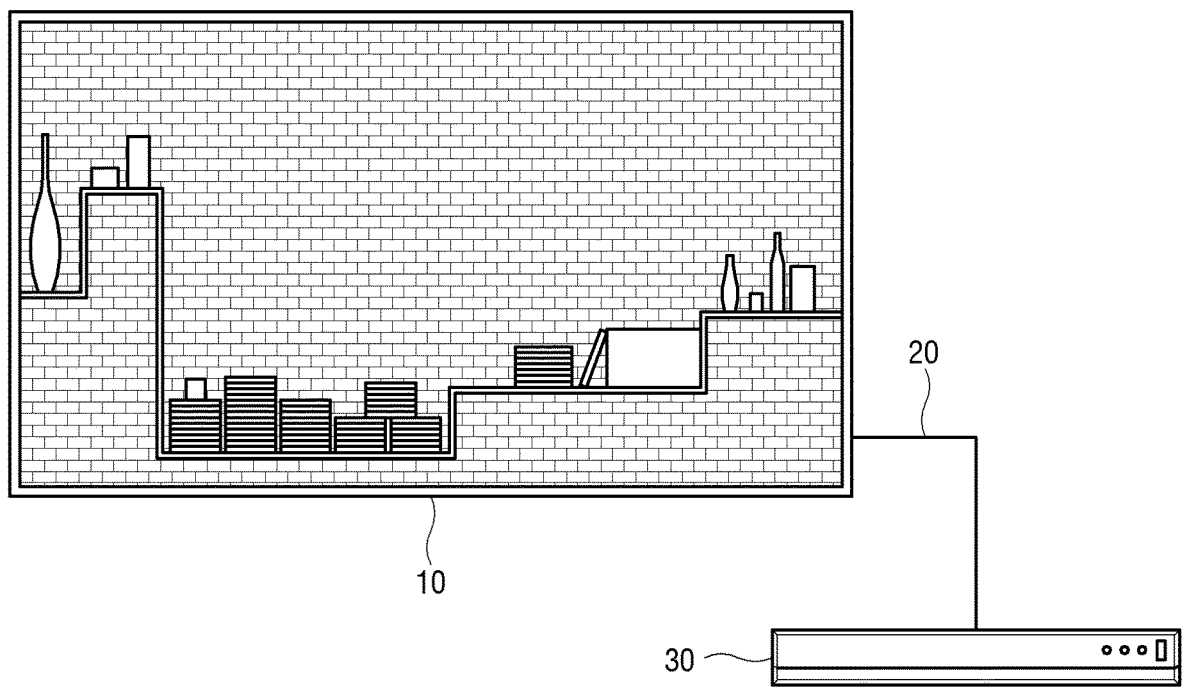
FIG. 1 illustrates that a display apparatus is installed according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is determined that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

According to an aspect of the disclosure, there is provided a display apparatus, which can selectively receive power from one between a first power source of a wall and a second power source of a separate electronic apparatus, and a method of controlling the same.

According to another aspect of the disclosure, there is provided a display apparatus, which is improved in safety because a plurality of switches operate with a predetermined period of time therebetween while switching over between a first power source and a second power source, and a method of controlling the same.

According to another aspect of the disclosure, there is provided a display apparatus, which includes a manual switch designed to comply with insulation standards for safety and enabling a user to select a first power source or a second power source through easy control, and a method of controlling the same.

FIG. 1 illustrates a display apparatus that is installed according to an embodiment of the disclosure.

Figure 2:
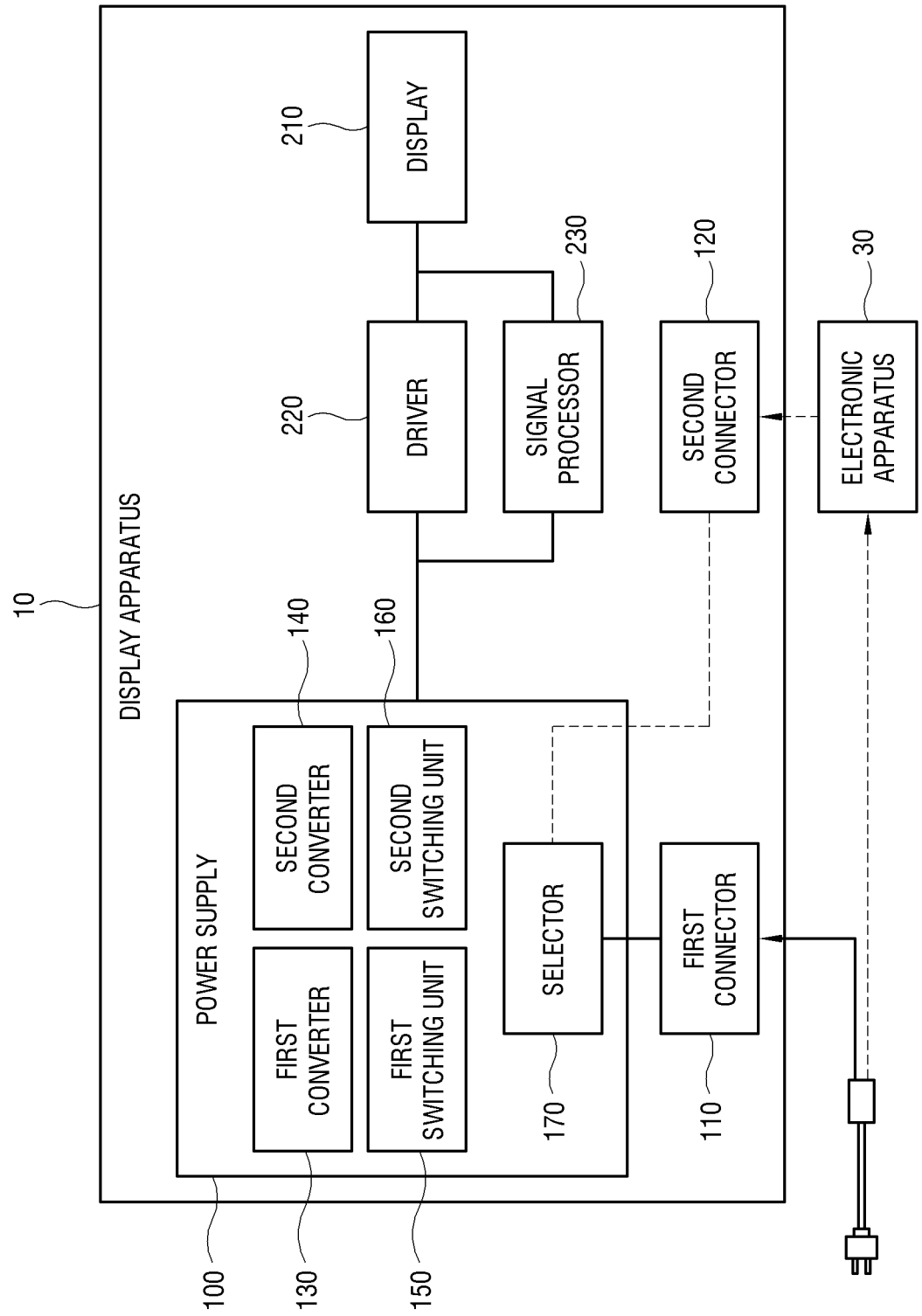
FIG. 2 is a block diagram of a display apparatus according to an embodiment of the disclosure.

Referring to FIG. 1, a display apparatus 10 according to an embodiment of the disclosure includes a screen for displaying an image, i.e. a display (see 210 in FIG. 2). As shown in FIG. 1, the display apparatus 10 connects with an electronic apparatus 30, which can output a signal corresponding to an image to be displayed on the display apparatus 10.

The electronic apparatus 30 outputs a signal for displaying an image based on content, which is received from an external image source or stored therein, to the display apparatus 10.

As shown in FIG. 1, the display apparatus 10 and the electronic apparatus 30 are connected by a cable 20. For instance, the display apparatus 10 and the electronic apparatus 30 may communicate with each or access/share data with each other by a cable 20. The display apparatus 10 receives data such as video/audio (AV) signals and a control signal from the electronic apparatus 30 via the cable 20. Further, the display apparatus 10 may receive power from the electronic apparatus 30 through the cable 20.

The display apparatus 10 and the electronic apparatus 30 are connected by a single cable 20 as shown in FIG. 1. Here, the cable 20 connecting the display apparatus 10 and the electronic apparatus 30 may be embodied by an optical cable into which a cable for transmitting and receiving AV data and a power cable are combined. The optical cable transmits and receives information through an optic fiber that has a core and cladding. To this end, a signal converter by which an electric signal and an optical signal are converted into each other may be provided in each of connectors at transmitting and receiving sides.

According to an embodiment, the cable 20 connecting the display apparatus 10 and the electronic apparatus 30 may be embodied by an invisible cable (hereinafter, referred to as a magic cable) so as not to spoil beauty even in a state that the display apparatus 10 and the electronic apparatus 30 are connected.

However, the connection between the display apparatus 10 according to the disclosure and the electronic apparatus 30 is not limited to the foregoing embodiment, and may employ wired or wireless interfaces based on various standards.

The wired interface may for example include a cable that complies with a predetermined standard. The wireless interface may for example include at least one of Wi-Fi, Wi-Fi direct, or Bluetooth.

In the display apparatus 10 according to an embodiment of the disclosure, the electronic apparatus 30 includes a media box as an auxiliary or appended apparatus that outputs a signal so that the display apparatus 10 can display images based on various pieces of content. In the display apparatus 10 according to an embodiment, the electronic apparatus 30 may also be referred to as a one-connect (OC) box because it is connected to the display apparatus 10 by the invisible cable or the like single cable 20.

The electronic apparatus 30 receives content from a plurality of image sources, i.e. signal sources. According to an embodiment, the electronic apparatus 30 may transmit the content received from the image source to the display apparatus 10 through the cable 20.

According to the disclosure, there are no limits to the kinds of image sources for providing content. For example, a set-top box (STB), a player for an optical disc such as Blu-ray disc or digital versatile disc (DVD), a personal computer (PC) such as a desktop or laptop computer, a mobile device including a smart pad such as a smartphone or a tablet computer, etc. Further, the electronic apparatus 30 may receive content provided in the form of a real-time streaming file through a wired or wireless network.

According to an embodiment, the display apparatus 10 may be embodied as a television (TV) that displays broadcast content.

When the display apparatus 10 is embodied as the TV, the electronic apparatus 30 may receive broadcast content based on at least one of a broadcast signal, broadcast information or broadcast data from a transmitter of a broadcasting station.

The electronic apparatus 30 may wirelessly receive a radio frequency (RF) signal, i.e. a broadcast signal from the broadcasting station. To this end, the electronic apparatus 30 may include an antenna configured to receive a broadcast signal, and a tuner configured to be tuned to a channel corresponding to a broadcast signal.

Here, the broadcast signal may be received through a terrestrial wave, a cable, a satellite, etc., and a signal source is not limited to the broadcasting station. That is, any apparatus or station capable of transmitting and receiving data may be included in the image source according to the embodiment.

The standards of the received signal may be varied depending on the types of the display apparatus 10. For example, the signal receiver 410 may receive a radio frequency (RF) signal from a broadcasting station wirelessly, or may receive an image signal based on composite video, component video, super video, syndicat des constructeurs des appareils radiorécepteurs et téléviseurs (SCART), high definition multimedia interface (HDMI) and the like standards by a wire.

The electronic apparatus 30 may receive content from various external apparatuses including a server through wired or wireless network communication, and there are no limits to the kinds of communication.

Specifically, the electronic apparatus 30 may perform at least one of wireless communication using an access point (AP) or wireless communication directly connected to other apparatuses without the AP. For example, the electronic apparatus 200 may receive content from an image source through Wi-Fi, Wi-Fi Direct, Bluetooth or the like wireless network communication. Alternatively, the electronic apparatus 30 may receive content through Ethernet or the like wired network communication.

The electronic apparatus 30 provides content, received by various methods as described above, to the display apparatus 10, so that an image based on the content can be displayed on the display apparatus 10.

According to an embodiment, the display apparatus 10 may directly receive content from an external image source without the electronic apparatus 30. That is, the display apparatus 10 according to the disclosure may be configured to receive a broadcast signal/an image signal by a wire or wirelessly based on at least one of various above-described methods. Further, the display apparatus 10 may directly receive commercial power, i.e. alternating current (AC) power through a wall socket installed on a wall of a house, an office, etc. without the electronic apparatus 30.

According to an aspect of the disclosure described below, the AC power received in the display apparatus 10 through the wall socket installed on the wall will be defined as first power (or primary power), and direct current (DC) power received in the display apparatus 10 through the electronic apparatus 30 connected to the display apparatus 10 will be defined as second power (or secondary power). Here, the second power may also be referred to as OC power in terms of being supplied to the display apparatus 10 through the electronic apparatus 30, i.e. the OC box.

When the display apparatus 10 receives the second power through the electronic apparatus 30, the electronic apparatus 30 receives the AC power, in other words, the first power through the wall socket connected to the wall, converts the received AC power into DC power having a predetermined level, and supplies the DC power as the second power to the display apparatus 10 through the cable 20.

Further, the display apparatus 10 may directly receive commands based on various user inputs from peripheral devices such as a remote controller through the electronic apparatus 30. Here, the command may be receivable from a remote controller through wireless communication, and the wireless communication may include infrared rays (IR) communication of a predetermined frequency band, Bluetooth, etc.

According to the disclosure, there are no limits to the position of the signal receiver for receiving a command based on a user input through the wireless communication, and therefore the signal receiver may be provided in one or both of the display apparatus 10 and the electronic apparatus 30.

According to an embodiment, the display apparatus 10 may operate as a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application refers to an application program for providing various kinds of services, for example, a social network service (SNS), finance, news, weather, a map, music, a movie, a game, an electronic book, etc.

Below, the configurations of the display apparatus and the electronic apparatus according to an embodiment of the disclosure will be described in detail with reference to the accompanying drawings.

Figure 3:
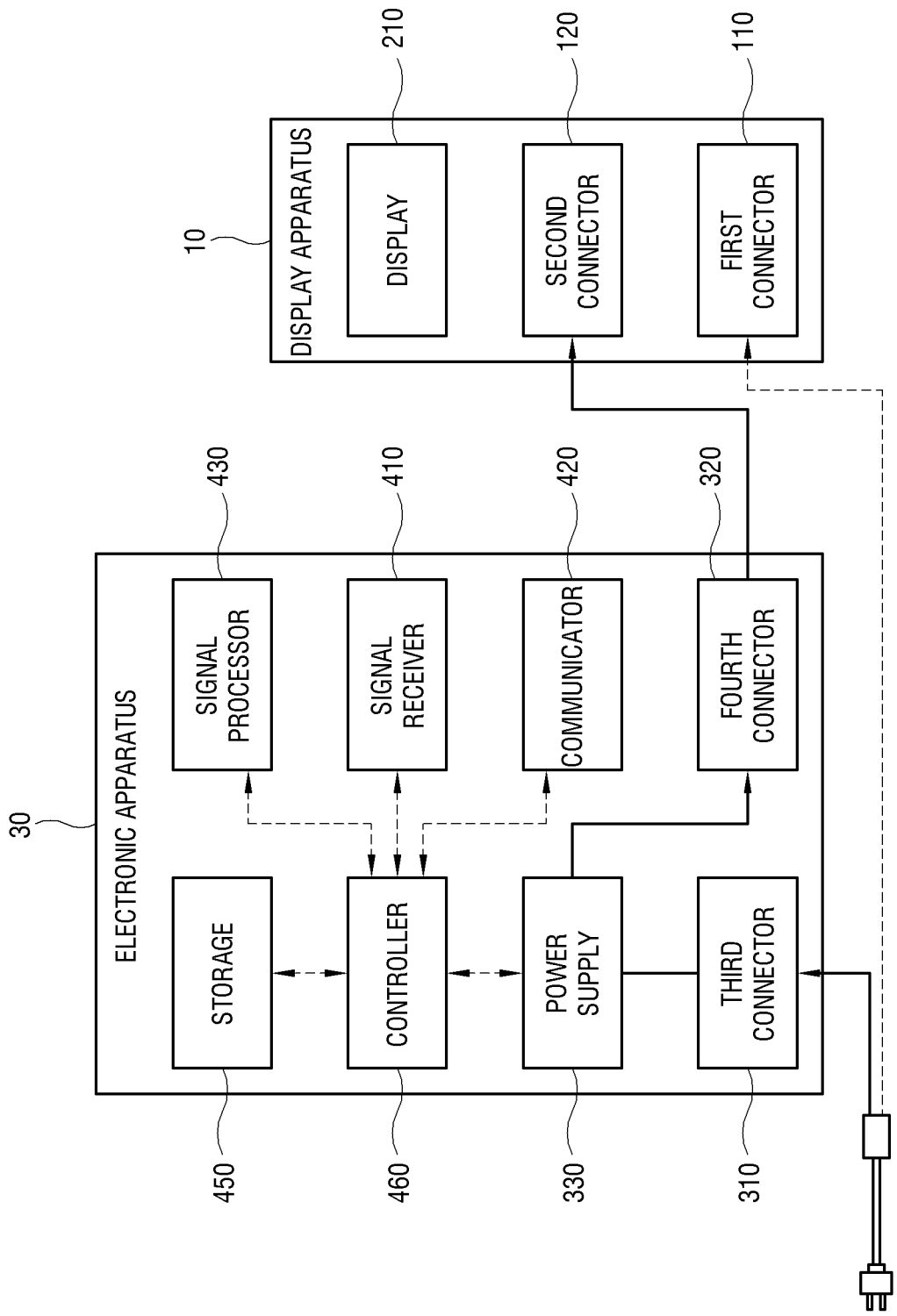
FIG. 3 is a block diagram of an electronic apparatus connected to a display apparatus according to an embodiment of the disclosure.

FIG. 2 is a block diagram of a display apparatus according to an embodiment of the disclosure, and FIG. 3 is a block diagram of an electronic apparatus connected to the display apparatus.

The display apparatus 10 according to an embodiment of the disclosure may, as shown in FIG. 2, includes a first connector 110 to which a first power source is connectable, a second connector 120 to which a second power source is connectable, a first converter 130 which converts power received from the first power source, a second converter 140 which supplies operation power to each element of the display apparatus 10 based on power converted by the first converter 130 or power received from the second power source, a first switching unit 150 by which the first connector 110 is connectable to the first converter 130, a second switching unit 160 by which the second connector 120 is connectable to the second converter 140, and a selector 170 which connects the first connector 110 and the first converter 130 or connects the second connector 120 and the second converter 140 based on power connection states of the first connector 110 and the second connector 120.

The display apparatus 10 may, as shown in FIG. 2, further include a display 210 on which an image is displayed, a driver 220 which drives the display 210, and a signal processor 230 which performs various preset video/audio processes with regard to a signal of content.

According to the disclosure, the elements included in the display apparatus 10 are not limited to the embodiment shown in FIG. 2, but may exclude some elements or include other additional elements (for example, a storage for storing content, a user input receiver for receiving a user input like a remote controller or a control panel, etc.).

According to an embodiment, the display 210 may include a panel to provide a screen on which an image is displayed.

There are no limits to the types of the display 210, and the display 210 may be embodied by various display types such as liquid crystal, plasma, a light-emitting diode, an organic light-emitting diode, a surface-conduction electron-emitter, a carbon nano-tube, nano-crystal, etc.

According to an embodiment, the driver 220 may be embodied by a T-con board, i.e. a driving board (see FIG. 4) provided with a timing controller that processes image data and generates a timing control signal to drive the display 210.

The signal processor 230 performs various preset video/audio processes with regard to a signal of content. The signal processor 230 outputs an image signal generated or combined by such processes to the display 210, so that an image based on the image signal can be displayed on the display 210.

The image signal processed in the signal processor 230 may be based on data provided by the electronic apparatus 30, or data stored in a flash memory, a hard disk drive, or the like nonvolatile internal storage. Further, the image signal processed in the signal processor 230 may correspond to the content directly received from an external image source to the display apparatus 10.

The signal processor 230 includes a video decoder for decoding an image signal to have an image format of the display apparatus 10, and a scaler for adjusting the image signal to correspond to the output standards of the display 210.

According to an embodiment, the decoder may, for example, be embodied by an H.264 decoder, but not limited thereto. In other words, the video decoder in this embodiment may for example be embodied by a moving picture experts group (MPEG) decoder, a high efficiency video codec (HEVC) decoder, or the like decoders corresponding to various compression standards.

Further, there are no limits to the kinds of content to be processed by the signal processor 230 according to the disclosure. For example, the content to be processed by the signal processor 230 may include not only a moving picture like a video, but also a still picture such as a picture of joint photographic experts group (JPEG) file, a background image, etc.

Here, there are no limits to the kinds of video processing process performed in the signal processor 230. For example, the signal processor 230 may for example perform at least one of various processes such as de-interlacing for converting an interlaced broadcast signal into a progressive broadcast signal, detail enhancement, frame refresh rate conversion, line scanning, etc.

The signal processor 230 may be embodied by a group of individual components for independently performing processes to process an image signal, or a main system-on-chip (SoC) where various functions are integrated. The main SoC may include at least one universal processor, for example, a central processing unit (CPU), an application processor (AP), or a microprocessor.

According to an embodiment, the signal processor 230 may be embodied by a video board including circuit elements such as various chipsets for performing respective processes, a memory, electronic parts, wirings, etc. are mounted on to a printed circuit board (PCB). In this case, the signal processor 230 and the foregoing processor of the display apparatus 1 may be provided on a single video board. Of course, this is merely an example, and they may be arranged on a plurality of PCBs connecting and communicating with each other.

The electronic apparatus 30 according to an embodiment of the disclosure, as shown in FIG. 3, includes a third connector 310 to which the first power source is connectable, a fourth connector 320 to which the second connector 120 of the display apparatus 10 is connectable, and a power supply 330 which converts power received from the first power source and outputs the converted power to the fourth connector 320.

The power supply 330 may for example be embodied by a switching mode power supply (SMPS), and convert the first power, i.e. the AC power received through the third connector 310 into DC power having a predetermined level. Such converted DC power is output to the fourth connector 320, and supplied as the second power to the display apparatus 10 via the fourth connector 320.

The electronic apparatus 30 may, as shown in FIG. 3, further include a signal receiver 410 which receives a signal of content from the outside, a communicator 420 which perform wired or wireless communication with at least one external apparatus, a signal processor 430 which processes the signal of the content received through the signal receiver 410 or the communicator 420 or stored therein, a storage 450 which is configured to store data, and a controller 460 which generally controls the electronic apparatus 30.

The signal receiver 410 receives a signal of content (i.e. an image signal) from the outside and transmits it to the signal processor 430. The standards of the received signal may be varied depending on the types of the display apparatus 10. For example, the signal receiver 410 may receive a radio frequency (RF) signal from a broadcasting station wirelessly, or may receive an image signal based on composite video, component video, super video, syndicat des constructeurs des appareils radiorécepteurs et téléviseurs (SCART), high definition multimedia interface (HDMI) and the like standards by a wire. The signal receiver 410 may be embodied by a communication circuitry including a data input/output interface where communication modules (an S/W module, a chip, etc.), ports, etc. are combined corresponding to various kinds of communication protocols.

According to an embodiment, the signal receiver 410 may include a tuner to be tuned to a channel for a broadcast signal when the image signal is the broadcast signal. Further, the image signal may be received from various peripheral apparatuses. Further, the image signal may be based on data received through the Internet or the like network. In this case, the electronic apparatus 30 may receive the image signal through the communicator 420 to be described later.

Further, the image signal may be based on data stored in a flash memory, a hard disk drive (HDD), and the like nonvolatile storage 450. The storage 450 may be provided inside or outside the electronic apparatus 30. When the storage 450 is provided at the outside, a connector may be added for connection with the storage 450.

The communicator 420 is configured to communicate with at least one external apparatus by a wired or wireless communication method. The communicator 420 includes a wired and/or wireless communication module. The communicator 420 may be embodied by a communication circuitry including communication modules (an S/W module, a chip, etc.) corresponding to various kinds of communication protocols.

According to an embodiment, the communicator 420 includes a wireless local area network (WLAN) unit. The WLAN unit may perform communication with at least one external apparatus through an access point (AP), i.e. a relay apparatus under control of the controller 460, and may include a Wi-Fi communication module.

According to an embodiment, the communicator 420 includes at least one of modules for short-range communication such as Bluetooth, Bluetooth low energy, RF communication, Wi-Fi Direct, Zigbee, ultrawideband (UWB), near field communication (NFC), infrared data association (IrDA) communication, etc. The short-range communication module is configured to support direct communication between the electronic apparatus 30 and at least one external apparatus without the AP.

According to an embodiment, the communicator 420 may further include a wired communication module such as Ethernet, etc.

The communicator 420 of the electronic apparatus 30 according to an embodiment of the disclosure may be embodied by one among the WLAN unit, the short-range communication module, and the wired communication module or combination of two among them according to required performance.

The image processor 430 performs various preset video/audio processing processes with regard to the image signal received through the signal receiver 410 or the communicator 420. The signal processor 430 outputs an output signal, which is generated or combined by performing such an video processing process, to the display apparatus 10 through a cable 20 connecting the fourth connector 320 of the electronic apparatus 30 and the second connector 120 of the display apparatus 10, so that the display 230 can display an image based on the image signal.

The signal processor 430 in this embodiment includes a decoder for decoding an image signal to have an image format for the display apparatus 10, and a scaler for scaling the image signal according to the output standards of the display 230. The decoder in this embodiment may for example be embodied by a moving picture experts group (MPEG) decoder. Here, there are no limits to the kinds of video processing process performed in the signal processor 430 according to this embodiment. For example, the video processing process may perform at least one of various processes such as de-interlacing for converting an interlaced broadcast signal into a progressive broadcast signal, noise reduction for improving image quality, detail enhancement, frame refresh rate conversion, line scanning, etc.

The signal processor 430 may be embodied by a group of individual components for independently performing processes to process an image signal, or a main SoC where various functions are integrated. The main SoC may include at least one processor as an example of the controller 460 to be described later.

According to an embodiment, the signal processor 430 may be embodied by a video board including circuit elements such as various chipsets for performing respective processes, a memory, electronic parts, wirings, etc. are mounted on to a PCB. In this case, the signal receiver 410, the signal processor 430 and the controller 460 of the display apparatus 10 may be provided on a single video board. Of course, this is merely an example, and they may be arranged on a plurality of PCBs connecting and communicating with each other.

The storage 450 is configured to store various pieces of data of the electronic apparatus 30. The storage 450 may be embodied by a nonvolatile memory (e.g. a writable memory) in which data is retained even though power supplied to the electronic apparatus 30 is cut off, and which writes and reflects changes. The storage 450 may include at least one of an HDD, a flash memory, an erasable and programmable read only memory (EPROM), or an electrically erasable and programmable read only memory (EEPROM).

The controller 460 performs control for operating general elements of the electronic apparatus 30. The controller 460 may include at least one of general-purpose processor that loads at least a part of a control program from a nonvolatile memory installed with the control program to a volatile memory and executes the loaded control program, and may be embodied by a CPU, an application processor (AP) or a microprocessor.

The processor 460 according to the disclosure may be embodied as included in the main SoC mounted to a built-in PCB of the electronic apparatus 30. According to an embodiment, the main SoC may further include the signal processor 430 for processing an image signal.

In the display apparatus 10 according to an embodiment of the disclosure, the first converter 130, the second converter 140, the first switching unit 150, the second switching unit 160 and the selector 170 may, as shown in FIG. 2, be included in the power supply 100. The power supply 100 may for example be achieved by an SMPS, and receive the first power (AC power) through the first connector 110.

Figure 4:
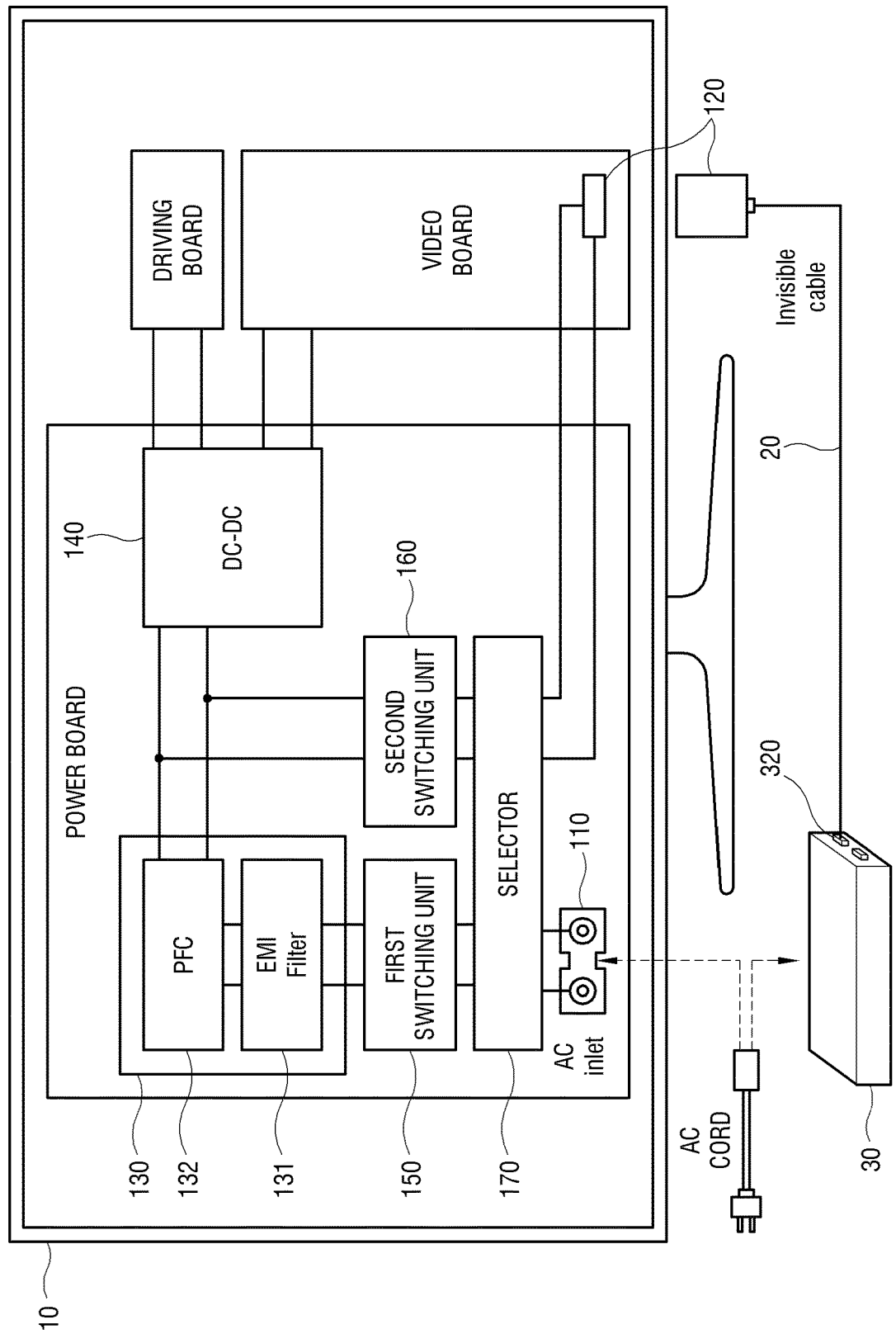
FIG. 4 illustrates selective connection between a display apparatus according to an embodiment of the disclosure and a first power source or a second power source.

According to an embodiment, the power supply 100 may be embodied by a power board including circuit elements such as various chipsets, a memory, electronic parts, wirings, etc. corresponding to the foregoing elements 130, 140, 150 and 160 mounted on to a PCB as shown in FIG. 4.

Figure 5:
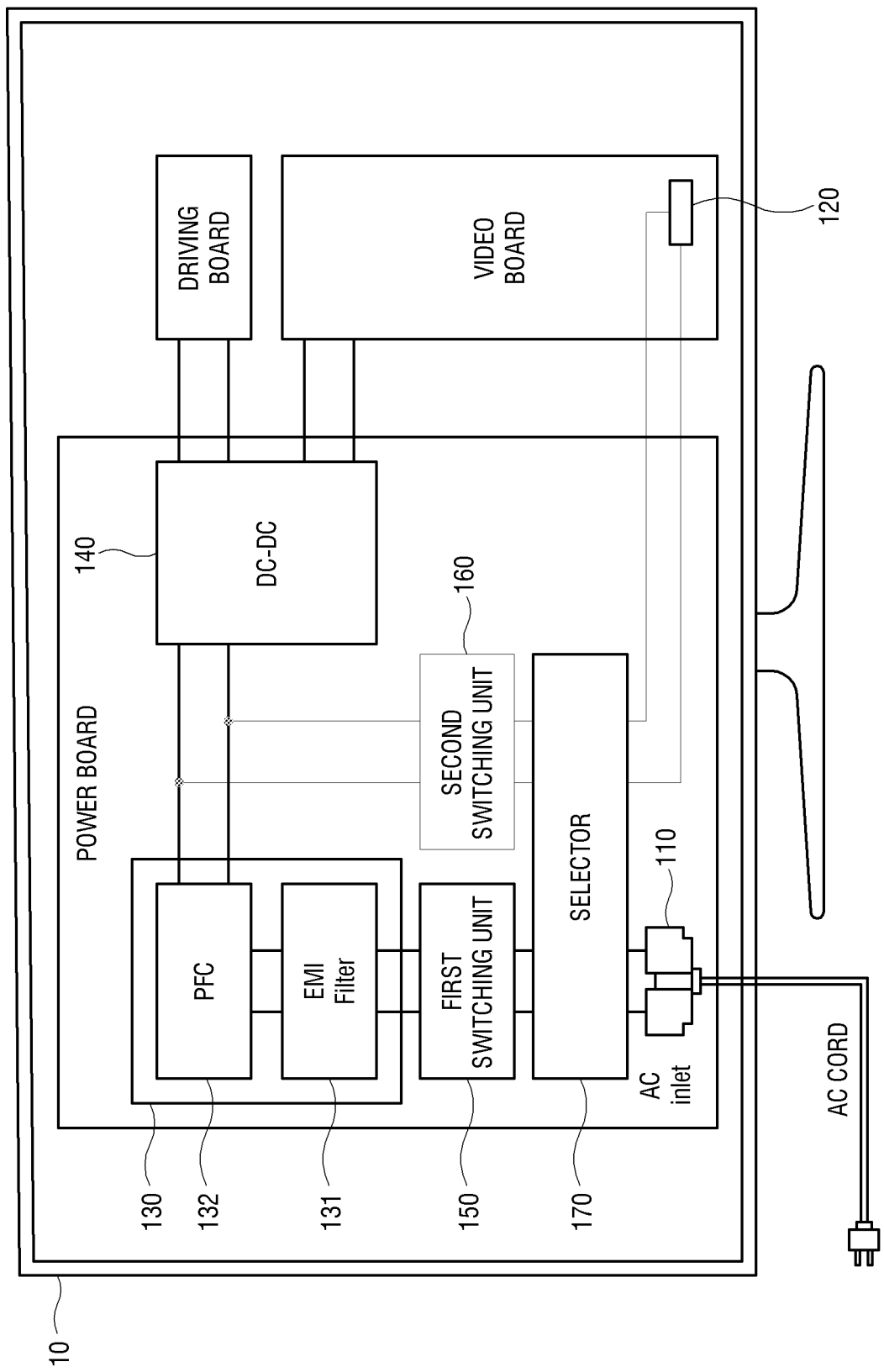
FIG. 5 illustrates that the display apparatus of FIG. 4 is connected to the first power source.
Figure 6:
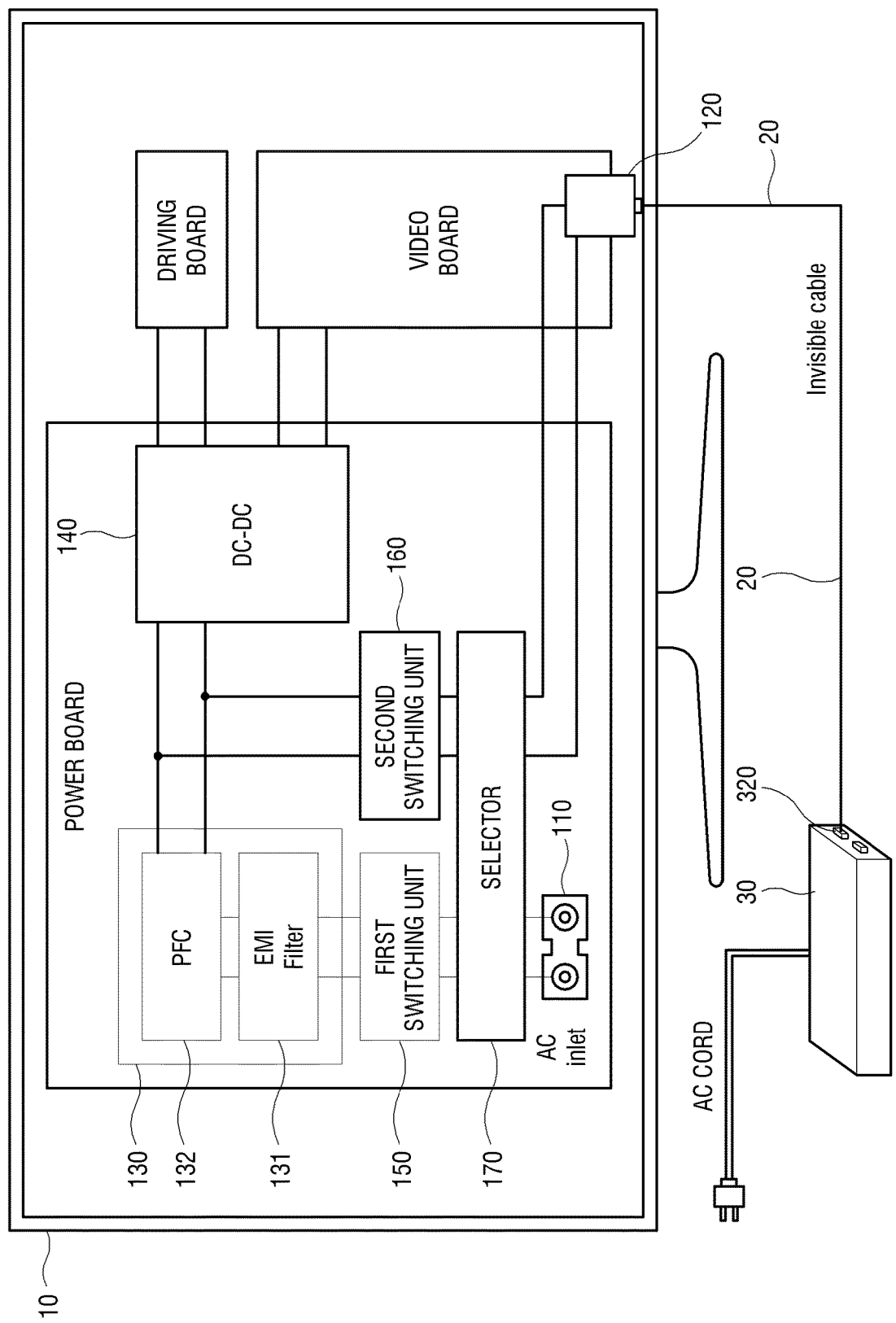
FIG. 6 illustrates that the display apparatus of FIG. 4 is connected to the second power source.

FIG. 4 illustrates selective connection between a display apparatus according to an embodiment of the disclosure and a first power source or a second power source, FIG. 5 illustrates that the display apparatus of FIG. 4 is connected to the first power source, and FIG. 6 illustrates that the display apparatus of FIG. 4 is connected to the second power source.

The first connector 110 receives commercial power (AC power) as the first power through a wall socket installed on the wall. The first connector 110 may, as shown in FIG. 4, be embodied by an AC inlet through which the AC power is receivable.

According to an embodiment, the first connector 110 may, as shown in FIG. 4, be provided on the power board, and in this case the power supply 100 may further include the first connector 110.

The second connector 120 receives DC power as the second power from the electronic apparatus 30 through the cable 20. The second connector 120 may, as shown in FIG. 4, be embodied by a connection terminal or connector by which the wired connection with the electronic apparatus 30 is possible using the cable 20.

According to an embodiment as shown in FIG. 4, the second connector 120 may be provided on the video board, and in this case, the signal processor 230 to be described later may include the second connector 120. However, according to the disclosure, the second connector 120 is not necessarily provided on the video board, but may be provided in another position, for example, the power board, etc. or a separate position.

As shown in FIG. 4, in the embodiment where the second connector 120 is provided on the video board, the display apparatus 10 may be connected to the electronic apparatus 30 by the cable 20 connected to the second connector 120, and receive power (i.e. the second power) and a signal corresponding to an image to be displayed on the display 210, i.e. an image signal through the connection cable 20.

Here, the second power refers to the DC power converted from the AC power input through the third connector 310 of the electronic apparatus 30 by the power supply 330 and output to the cable 20 through the fourth connector 320. The image signal received in the display apparatus 10 through the cable 20 is processed by the signal processor 230, and displayed as an image on the display 130.

The first converter 130 converts power (i.e. AC power) input as the first power through the first connector 110 into the DC power.

According to an embodiment, the first converter 130 may, as shown in FIG. 4, include an electromagnetic interference (EMI) filter 131 to remove noise of the input AC power, and a power factor corrector (PFC) 132 to convert the AC power into the DC power by correcting a power factor (PF).

The second converter 140 supplies operation power to the driver 220, the signal processor 230, the display 210, and the like elements of the display apparatus 10, based on power converted from AC into DC by the first converter 130 or power (DC power) input as the second power through the second connector 110.

The second converter 140 may be embodied by a DC-DC converter that converts DC power to have DC levels required in operations of the elements of the display apparatus 10. In the display apparatus 10 according to an embodiment of the disclosure, the second converter 140 may be an isolated DC-DC converter.

According to an embodiment, the second converter 140 may employ an LLC resonance converter (or an LLC converter). However, in the display apparatus 10 of the disclosure, there are no limits to the types of the second converter 140, and the second converter 140 may be embodied by one of various types of DC-DC converters, for example, a flyback converter, a forward converter, etc.

The first switching unit 150 and the second switching unit 160 are configured to selectively connect the first connector 110 and the first converter 130, and selectively connect the second connector 120 and the second converter 140, respectively. According to an example embodiment, the first switching unit 150 and the second switching unit 160 may be switches of any one of various types, including but not limited to semiconductor switches.

According to an embodiment, each of the first switching unit 150 and the second switching unit 160 may be embodied by a relay switch to be turned on or off based on an operation signal. In the display apparatus 10 according to an embodiment of the disclosure, the grounds GND of the first power source and the second power source are separated from each other, and the first switching unit 150 and the second switching unit 160 are installed to be separated by more than a predetermined distance to satisfy insulating standards.

According to an embodiment, the first switching unit 150 is embodied by a B-type relay device that is kept turned on in a normal state of no signals but turned off when a signal for operation is applied. Further, the second switching unit 160 is embodied by an A-type relay device that is kept turned on in a normal state of no signal but turned off when a signal for operation is applied. However, the first switching unit 150 and the second switching unit 160 according to the disclosure are not limited to the foregoing embodiment.

The selector 170 controls switching operations of the first switching unit 150 and the second switching unit 160, based on power connection states of the first connector 110 and the second connector 120 to the display apparatus 10, in other words, based on whether the first power source is connected to the first connector 110 or the second power source is connected to the second connector 120.

Specifically, as shown in FIG. 5, wall power (i.e. AC power) is supplied to the display apparatus 10 as the first power source is connected to the first connector 110, the selector 170 turns on the first switching unit 150 to connect the first connector 110 and the first converter 130. Here, the selector 170 turns off the second switching unit 160 to control the second connector 120 and the second converter 140 to be disconnected.

Thus, commercial power, in other words, AC power is supplied as the first power to the display apparatus 10 through the first connector 110. Such supplied first power (AC) is transferred to the first converter 130 via the first switching unit 150, and converted into DC power. Further, the converted DC power are adjusted in level by the second converter 140, and supplied as operation power to the elements such as the display 210, the driver 220, the signal processor 230, and the like elements of the display apparatus 10.

On the other hand, as shown in FIG. 6, when the second power source is connected to the second connector 120 and OC power (i.e. DC power) is supplied from the electronic apparatus 30 to the display apparatus 10, the selector 170 turns on the second switching unit 160 so that the second connector 120 can be connected to the second converter 140. Here, the selector 170 turns off the first switching unit 150 to control the first connector 110 and the first converter 130 to be disconnected.

Thus, the OC power converted into the DC power in the electronic apparatus 30 is supplied as the second power source to the display apparatus 10 through the second connector 120. Such supplied second power source (DC) is transferred to the second converter 140 via the second switching unit 160. Further, the transferred DC power is adjusted in level by the second converter 140, and supplied as operation power to the elements such as the display 210, the driver 220, the signal processor 230, and the like elements of the display apparatus 10.

The display apparatus 10 according to an embodiment of the disclosure may selectively receive power from one of the first power source (AC) corresponding to the wall power and the second power source (DC) received through the electronic apparatus 30, based on the foregoing automatic switching operations of the first switching unit 150 and the second switching unit 160. Thus, the display apparatus may be used as installed alone or may be used as installed connecting with the electronic apparatus, based on a user's preferences.

Figure 7:
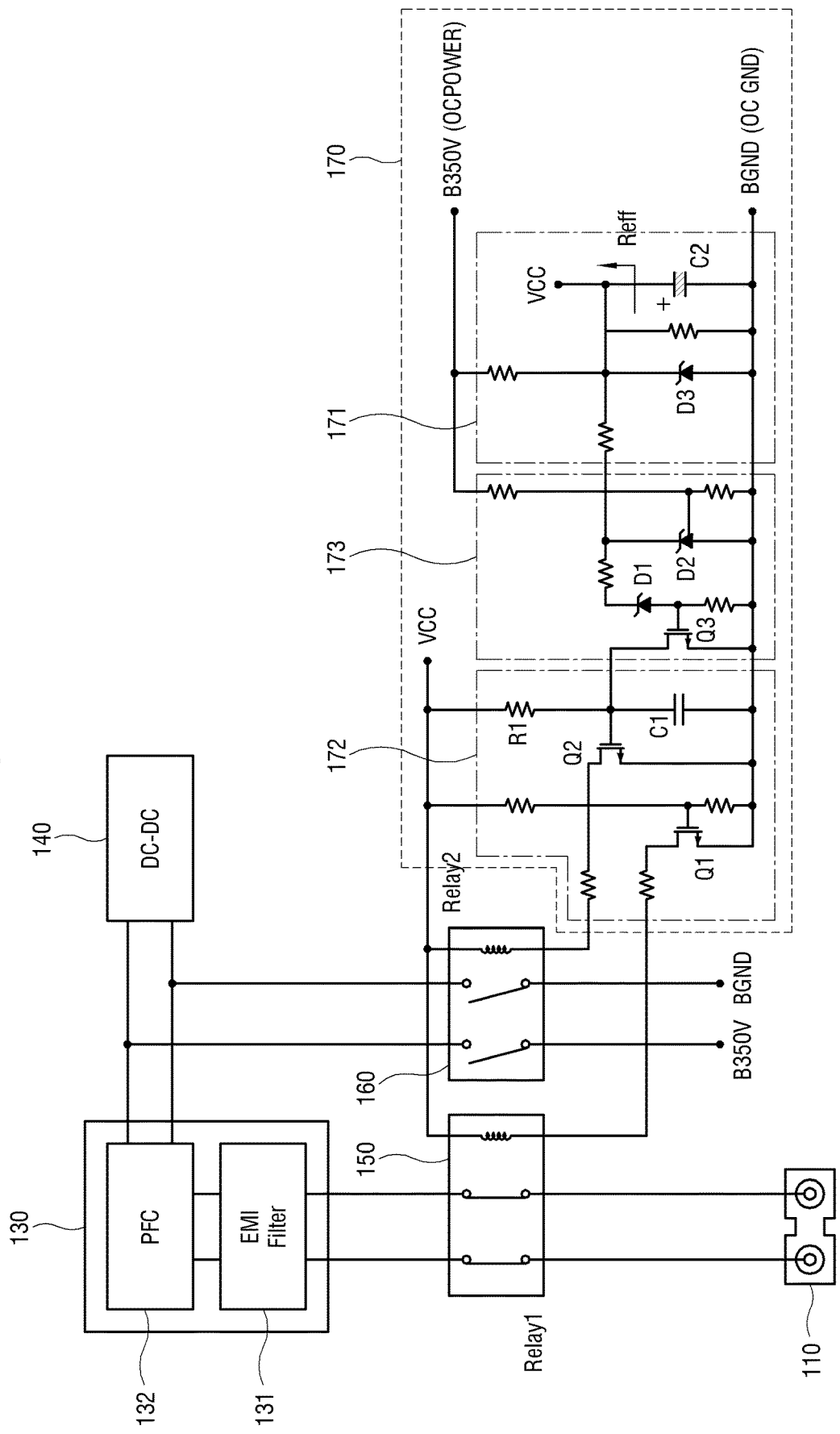
FIG. 7 is a circuit diagram of a selector in a display apparatus according to an embodiment of the disclosure.
Figure 8:
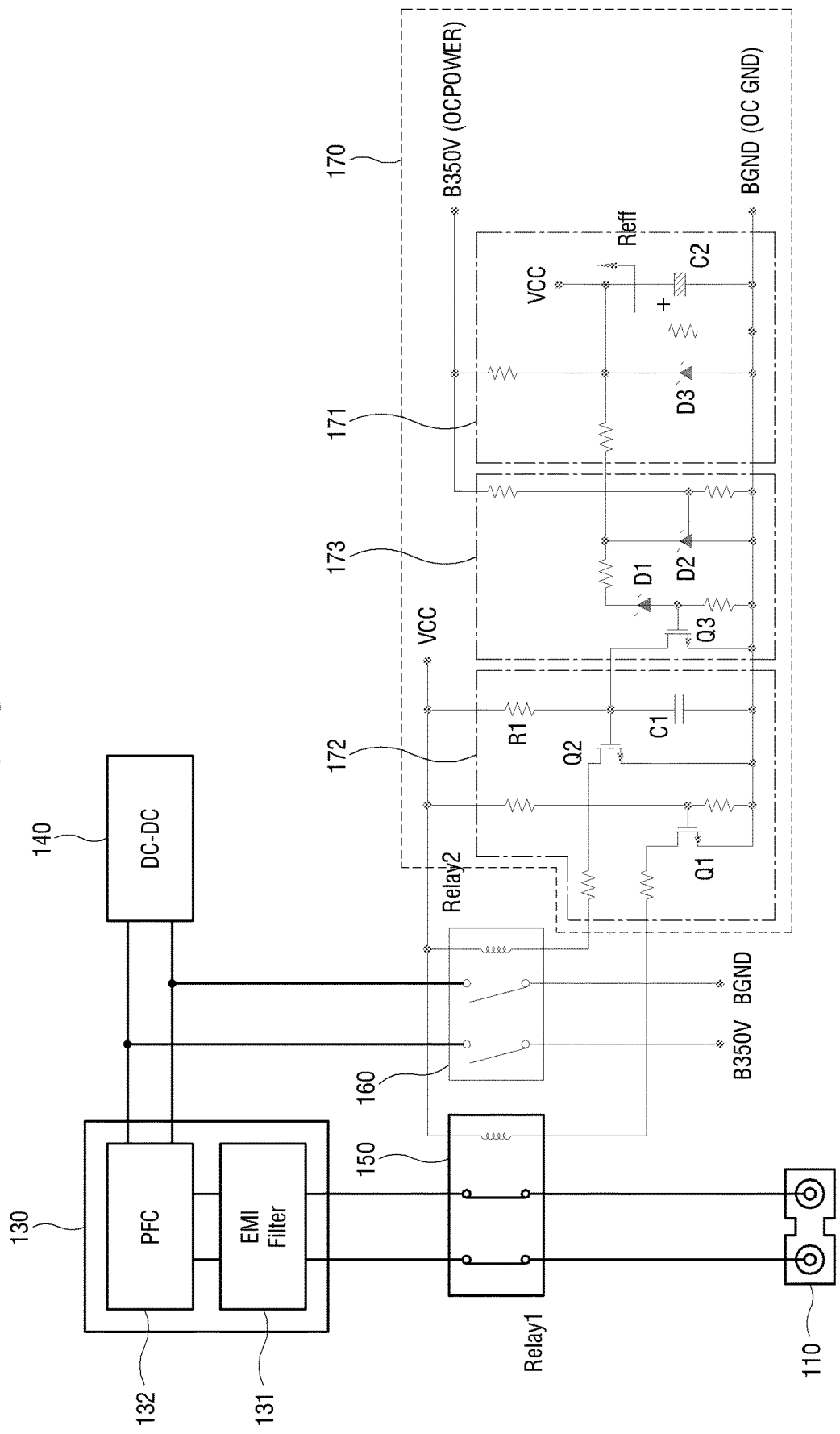
FIG. 8 illustrates connection with the first power source in the circuit diagram of FIG. 7.
Figure 9:
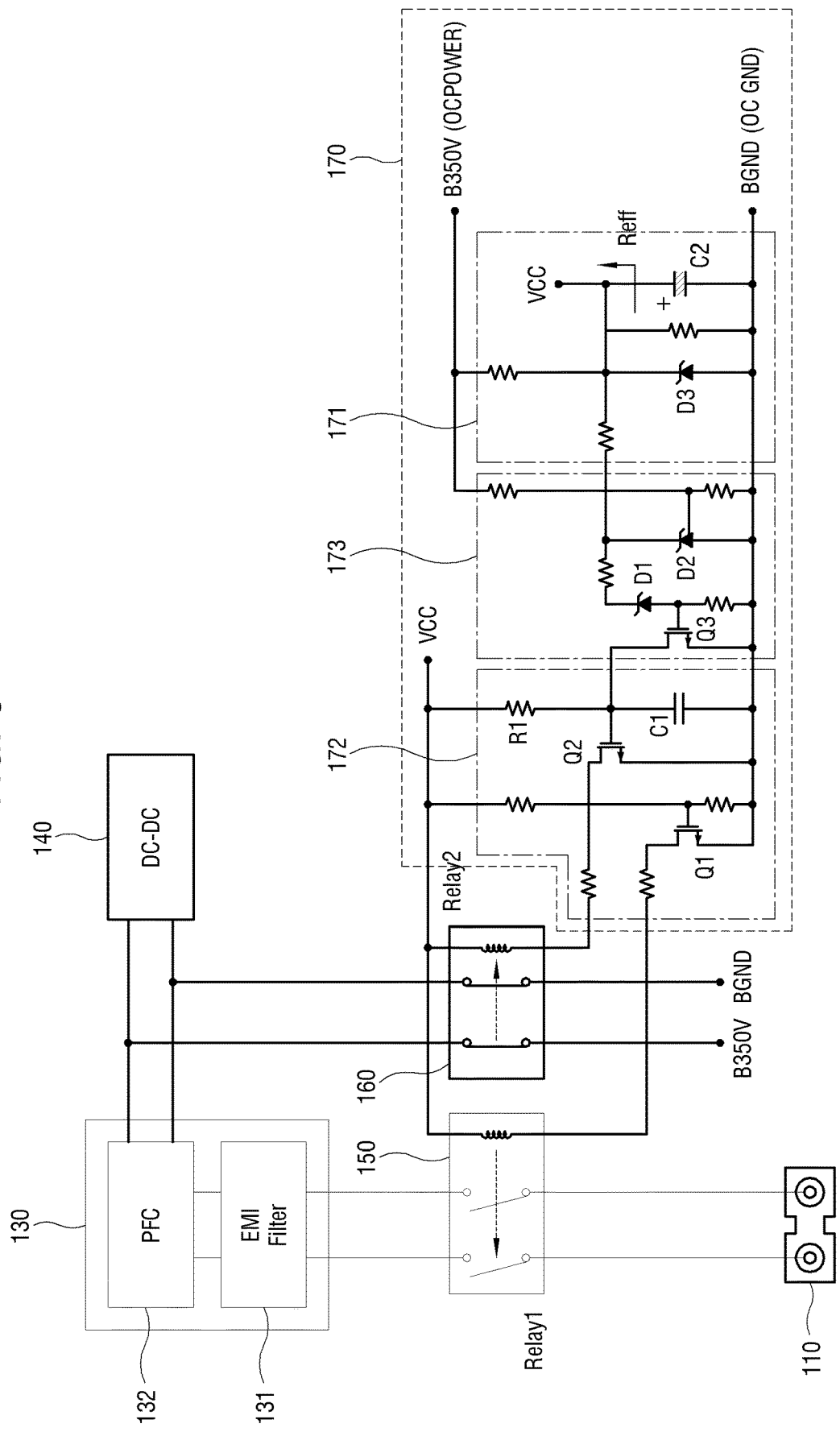
FIG. 9 illustrates connection with the second power source in the circuit diagram of FIG. 7.
Figure 10:
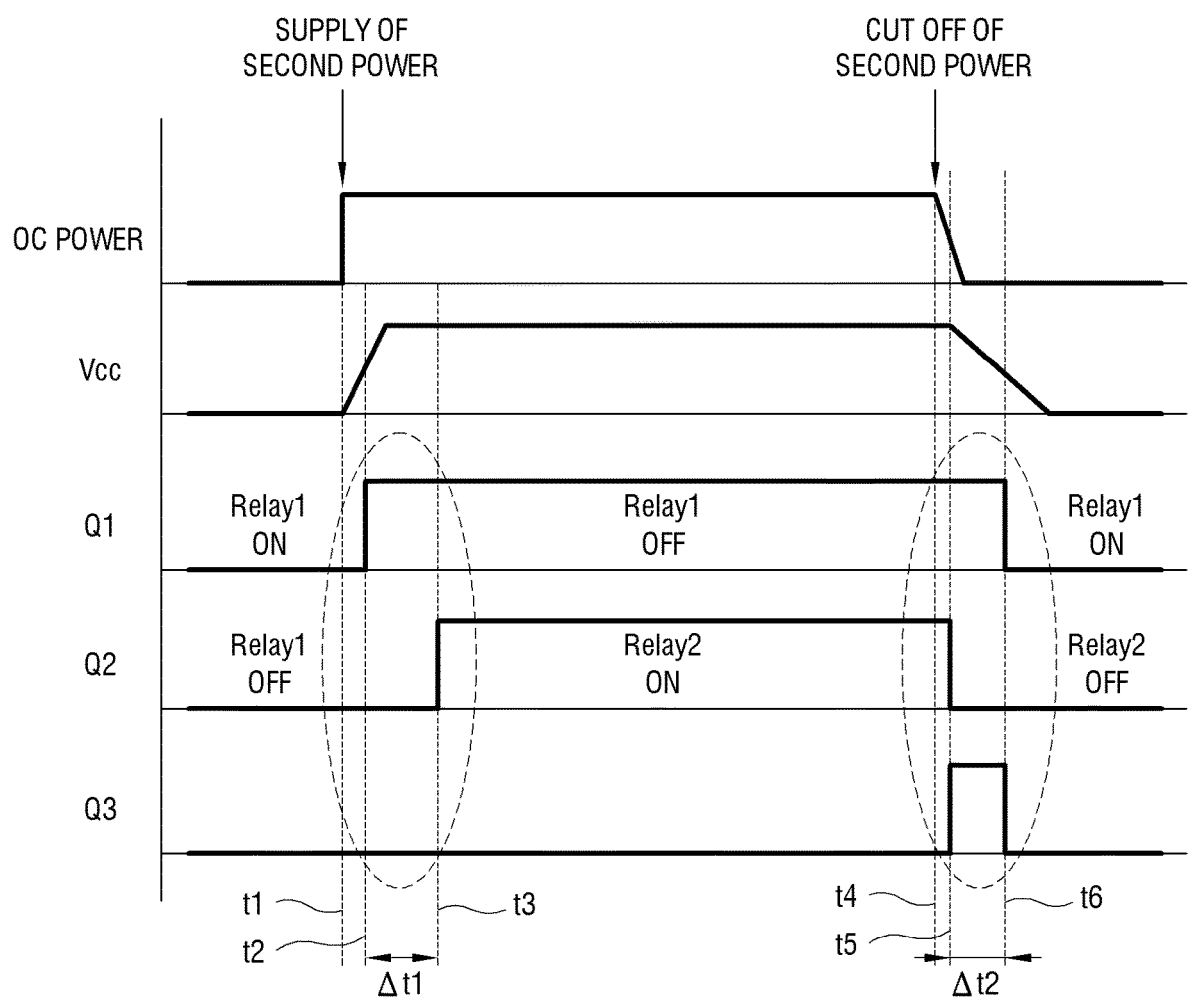
FIG. 10 illustrates sequential operations of elements in a selector of a display apparatus according to an embodiment of the disclosure.

FIG. 7 is a circuit diagram of a selector in a display apparatus according to an embodiment of the disclosure, FIG. 8 illustrates connection with the first power source in the circuit diagram of FIG. 7, and FIG. 9 illustrates connection with the second power source in the circuit diagram of FIG. 7. FIG. 10 illustrates sequential operations of elements in a selector of a display apparatus according to an embodiment of the disclosure.

In the display apparatus 10 according to an embodiment, the selector 170 includes a voltage generator 171, an operator 172 and a detector 173 as shown in FIG. 7.

The selector 170 of the display apparatus 10 according to an embodiment of the disclosure shown in FIGS. 7 to 9 is configured to operate when the second power is supplied from the electronic apparatus 30 to the display apparatus 10 through the second connector 120, or when the second power is not supplied through the second connector 120.

In other words, the first switching unit 150 is turned on but the second switching unit 160 is turned off as shown in FIG. 8 while power is not connected/supplied to the second connector 120, and therefore the display apparatus 10 operates with a first voltage received through the first connector 110.

The voltage generator 171 is, as shown in FIG. 7, configured as a circuit including a Zener diode D3.

The voltage generator 171 is configured to generate a voltage Vcc when the second power source (i.e. the OC power source) is connected to the second connector 120 and thus the second power (DC) is supplied from the electronic apparatus 30 to the second connector 120. Here, the second power (i.e. OC power) input to the second connector 120 has a high voltage, for example, of about 350V, and thus needs to be dropped by the Zener diode D3 into a relatively low voltage Vcc.

The voltage generator 171 further includes a capacitor C2, and the capacitor C2 may be designed to have capacitance high enough for stable operations.

The operator 172 may, as shown in FIG. 7, be embodied by a circuit that includes a switch Q1 to operate the first switching unit 150 and a switch Q2 to operate the second switching unit 160, based on connection or disconnection between the second connector 120 and the second power source.

The operator 172 may control the display apparatus 10 to perform the operations of the first switching unit 150 and the second switching unit 160, based on connection between the second connector 120 and the second power source to supply, i.e. apply power from the electronic apparatus 30 to the display apparatus 10. Here, the operator 172 operates the switches Q1 and Q2 with a predetermined period of time therebetween, to thereby operate the first switching unit 150 and the second switching unit 160 in sequence at predetermined time intervals.

Specifically, when the second power is supplied to the second connector 120 at a point in time t1 as the cable 20 for connection with the electronic apparatus 30 is connected to the second connector 120, a voltage Vcc is boosted by the voltage generator 171 as shown in FIG. 10. With the boost of the voltage Vcc, the switch Q1 is turned on at a point in time t2 after the point in time t1, and thus the operator 172 detects the supply of the second power source (i.e. OC power).

As the switch Q1 is turned on, a signal is output to the first switching unit 150, and the first switching unit 150 operates based on the signal output from the switch Q1. Therefore, the first switching unit 150 (or Relay 1) is, as shown in FIGS. 9 and 10, switched over from an ON state to an OFF state.

Further, when the voltage Vcc is continuously boosted as the second power is applied through the second connector 120, the switch Q2 is turned on at a point in time t3, and outputs a signal to the second switching unit 160. The second switching unit 160 (or Relay 2) operates based on the signal output from the switch Q2, and is, as shown in FIG. 9 and FIG. 10, switched over from an OFF state to an ON state.

In the display apparatus 10 according to an embodiment of the disclosure, the point in time when the switch Q2 is turned on may be set based on RC time constant designed for a resistor R1 and a capacitor C1 of the operator 172. Specifically, the switch Q2 is configured to be turned on at a point in time t3 when a predetermined period of time (Δt1) elapses after the switch Q1 is turned on. Here, Δt1 may for example be about 10~20 ms.

According to an embodiment, the RC time constant may be obtained by the following mathematical expression 1.

$$R_1 C_1 > \frac{-t_{relay1\_offtime}}{\ln\left(1 - \frac{V_{th\_Q2}}{V_{cc}}\right)} \quad \text{[Expression 1]}$$

Where, $V_{th\_Q2}$ is the threshold level of the switch Q2. Further, $t_{relay1\_offtime}$ is time taken in turning off the B-type relay device of the first switching unit 150, is varied depending on the B-type relay device, and may for example have the maximum value of 15 ms as shown in the following table 1 (from the data sheet of the relay device).

TABLE 1

| | |
|---|---|
| Operate time (at normal voltage) (at 20° C. 68° F.) | Max. 15 ms (excluding contact bounce time.) |
| Release time (at normal voltage) (at 20° C. 68° F.) | Max. 15 ms (excluding contact bounce time.) (Without diode) |

In the display apparatus 10 according to an embodiment of the disclosure, the selector 170 of which the RC time constant is designed as described above may control a gate voltage of the switch Q2 not to reach the threshold level of the switch Q2 until the first switching unit 150 is completely turned off. Therefore, as shown in FIG. 10, the second switching unit 160 is turned on when a predetermined period of time elapses after the first switching unit 150 is turned off, and thus both the first power and the second power are prevented from being simultaneously applied to the display apparatus 10 to which the first power or the second power is selectively applicable, thereby securing safety of operations.

The detector 173 assists the operator 172, so that the operator 172 can perform proper operations based on disconnection from the second power source.

The detector 173 is, as shown in FIG. 7, embodied by a circuit that includes a switch Q3 capable of outputting a signal to the switch Q2 operating the second switching unit 160, based on connection and disconnection of the second power source for the second power supplied to from the electronic apparatus 30 to the display apparatus 10 through the second connector 120. The detector 173 may further include Zener diodes D1 and D2 that form a comparator circuit to operate the switch Q3 when the level of the second power is equal to or lower than a setting level.

The detector 173 detects the supply of the first power as selective supply of power to the display apparatus 10 by detecting whether the second power is supplied or not from the electronic apparatus 30 to the display apparatus 10 through the second connector 120. Further, the detector 173 operates the switches Q2 and Q1 with a predetermined period of time therebetween, to thereby operate the second switching unit 160 and the first switching unit 150 of the operator 172 in sequence at predetermined time intervals.

Specifically, when the second power supplied to the second connector 120 is stopped/cut off at a point in time t4 as the cable 20 for connection with the electronic apparatus 30 is disconnected/removed from the second connector 120, the voltage Vcc is dropped as shown in FIG. 10.

When the voltage Vcc is dropped, a voltage not lower than a predetermined level is immediately applied to the diode D2, and a high signal is applied to the switch Q3 to operate, i.e. turn on the switch Q3 at a point in time t5, thereby discharging electricity from the capacitor C1.

As the switch Q3 operates, the gate voltage of the switch Q2 becomes 0V, and thus the switch Q2 operates, i.e. is turned off at a point in time t5 as shown in FIG. 10, thereby turning off the second switching unit 160 (or Relay 2) as shown in FIGS. 8 and 10. Here, the switch Q2 is immediately disconnected from the second connector 120 by the switch Q3, thereby turning off the second switching unit 160.

In the display apparatus 10 according to an embodiment of the disclosure, the switch Q1 is kept turned on for a predetermined period of time (Δt2) even though the switch Q2 is turned off, and then turned off at a point in time t6. Here, when the voltage Vcc is dropped by free discharge to the threshold level or lower after the disconnection between the second connector 120 and the second power source, the switch Q1 is naturally turned off.

When the switch Q1 is turned off, the first switching unit 150 (or Relay 1) is switched over to the ON state as shown in FIGS. 8 and 10. Here, Δt2 may for example be about 10~20 ms.

According to an embodiment, the capacitance C2 may be configured to satisfy the condition of the following mathematical expression 2.

$$R_{eff} C_2 > \frac{-t_{relay2\_offtime}}{\ln\left(\frac{V_{th\_Q1}}{V_{cc}}\right)} \quad \text{[Expression 2]}$$

Where, $V_{th\_Q1}$ is the threshold level of the switch Q1, and Reff is effective resistance of the capacitor C2 and varied depending on circuit design. To compensate for this, the capacitor C2 may be designed to have capacitance high enough to be minimally affected by Reff. Further, $t_{relay2\_offtime}$ is time taken in turning off the A-type relay device of the second switching unit 160, and is varied depending on the A-type relay device.

In the display apparatus 10 according to an embodiment of the disclosure, the selector 170, of which the capacitor C2 is designed to have the value as described above, may control the switch Q1 to be turned off when a predetermined period of time elapses after the switch Q2 is turned off. Therefore, the first switching unit 150 is turned on when a predetermined period of time (Δt2) elapses after the second switching unit 160 is turned off, and thus both the first power and the second power are prevented from being simultaneously applied to the display apparatus 10 to which the first power or the second power is selectively applicable, thereby securing safety of operations.

Figure 11:
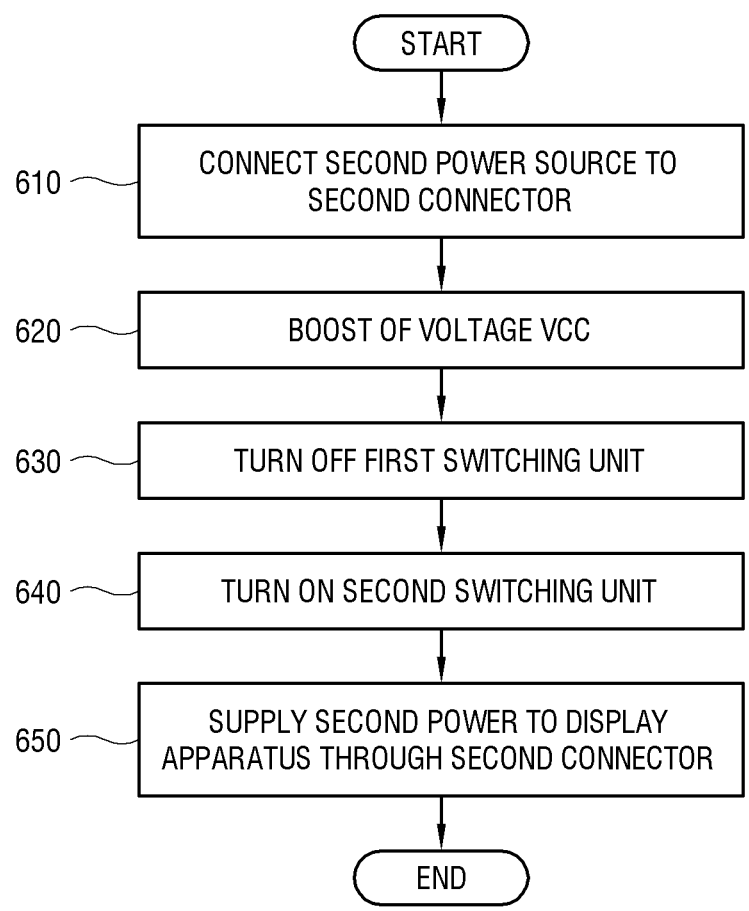
FIG. 11 is a flowchart showing operations when a display apparatus according to an embodiment of the disclosure is connected to a second power source.

FIG. 11 is a flowchart showing operations when a display apparatus according to an embodiment of the disclosure is connected to a second power source.

As shown in FIG. 11, the second power source (DC) is connected to the second connector 120 of the display apparatus 10, thereby supplying the second power from the electronic apparatus 30 through the second connector 120 (610).

When the second power source is connected in the operation 610, the voltage Vcc is boosted based on the operation of the voltage generator 171 of the selector 170 as described with reference to FIGS. 9 and 10 (620).

With the boost of the voltage Vcc in the operation 620, the switch Q1 of the operator 172 operates to turn off the first switching unit 150 as shown in FIG. 9 (630).

When the voltage Vcc is continuously increased while a predetermined period of time ($\Delta t1$) elapses after the first switching unit 150 is turned off in the operation 630, the switch Q2 operates to turn on the second switching unit 160 as shown in FIG. 9 (640).

As the first switching unit 150 is turned off and the second switching unit 160 is turned on, the selector 170 enters the state as shown in FIG. 9, so that the second power can be supplied to the display apparatus 10 through the second connector 120 (650).

In this way, the second power supplied through the second connector 120 is transferred to the second converter 140 through the second switching unit 160, converted by the second converter 140 to have levels required for the operations of the elements (e.g. the display 210, etc.) of the display apparatus 10, and supplied as the operation power to the corresponding elements.

With the foregoing operations, the display apparatus 10 automatically cuts off the first power when the second power source supplying the second power (i.e. OC power) from the electronic apparatus 30 through the cable 20 is connected to the second connector 120 even though the first power source has already been connected to the first connector 110, and therefore the display apparatus 10 can be driven with the second power supplied from the electronic apparatus 30. Further, in this process, the second switching unit 160 is turned on to supply the second power when a predetermined period of time ($\Delta t1$) elapses after the first power is cut off as the first switching unit 150 is turned off, thereby securing safety.

Figure 12:
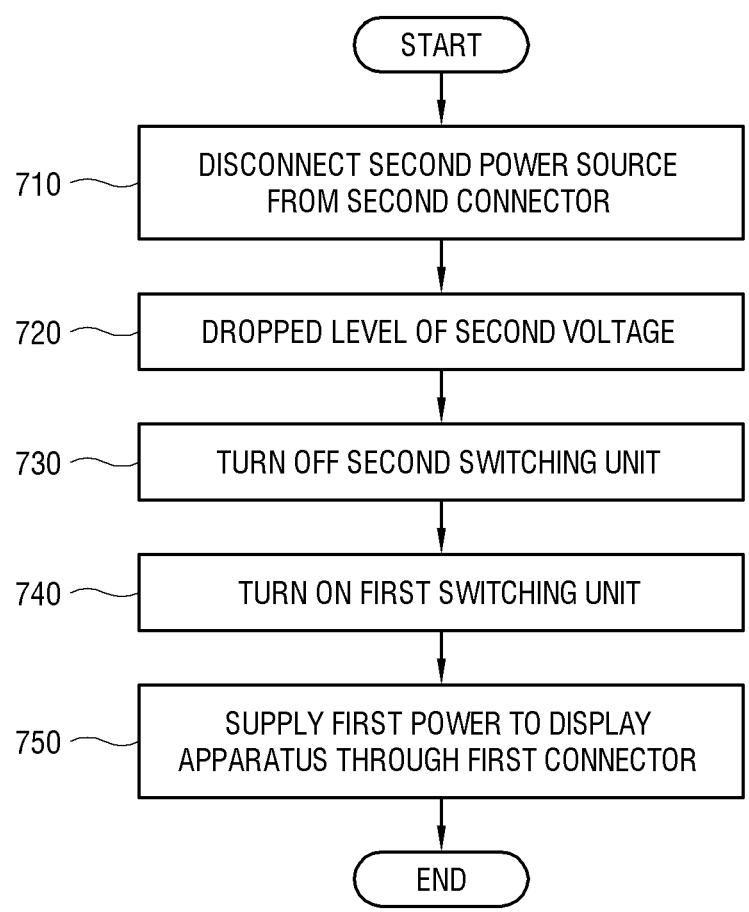
FIG. 12 is a flowchart showing operations when a display apparatus according to an embodiment of the disclosure is disconnected from the second power source.

FIG. 12 is a flowchart showing operations when a display apparatus according to an embodiment of the disclosure is disconnected from the second power source.

As shown in FIG. 12, the second power source (DC) is removed from the second connector 120 of the display apparatus 10, thereby cutting off the second power supplied from the electronic apparatus 30 through the second connector 120 (710).

When the second power source is removed in the operation 710, the second voltage (OC voltage) is dropped down, i.e. decreases in level (720).

With the decreased level of the second voltage in the operation 720, the switch Q3 of the detector 173 is in an operation state and thus the switch Q2 is in an operation state, thereby turning off the second switching unit 160 as shown in FIG. 8 (730).

Further, when the second voltage is continuously decreased while a predetermined period of time ($\Delta t2$) elapses after the second switching unit 160 is turned off in the operation 730, the switch Q1 operates, thereby turning on the first switching unit 150 as shown in FIG. 8 (740).

As the second switching unit 160 is turned off and the first switching unit 150 is turned on, the selector 170 enters the state as shown in FIG. 8, thereby supplying the first power (AC) to the display apparatus 10 through the first connector 110 (750).

In this way, the first power (AC) supplied through the first connector 110 is transferred to the first converter 130 through the first switching unit 150, and subjected to noise removal and converted into DC power by the first converter 130. The DC power may be transferred from the first converter 130 to the second converter 140, converted by the second converter 140 to have levels required for the operations of the elements (e.g. the display 210, etc.) of the display apparatus 10, and supplied as the operation power to the corresponding elements.

With the foregoing operations, the display apparatus 10 automatically cuts off the second power when the second power source supplying the second power (i.e. OC power) from the electronic apparatus 30 through the cable 20 is disconnected from the second connector 120 in the state that the first power source (AC) power is connected to the first connector 110, and therefore the display apparatus 10 can be driven with the first power supplied from the wall socket. Further, in this process, the second witching unit 160 is turned off to supply the first power when a predetermined period of time ($\Delta t2$) elapses after the second power is cut off as the second switching unit 160 is turned off, thereby securing safety.

Figure 13:
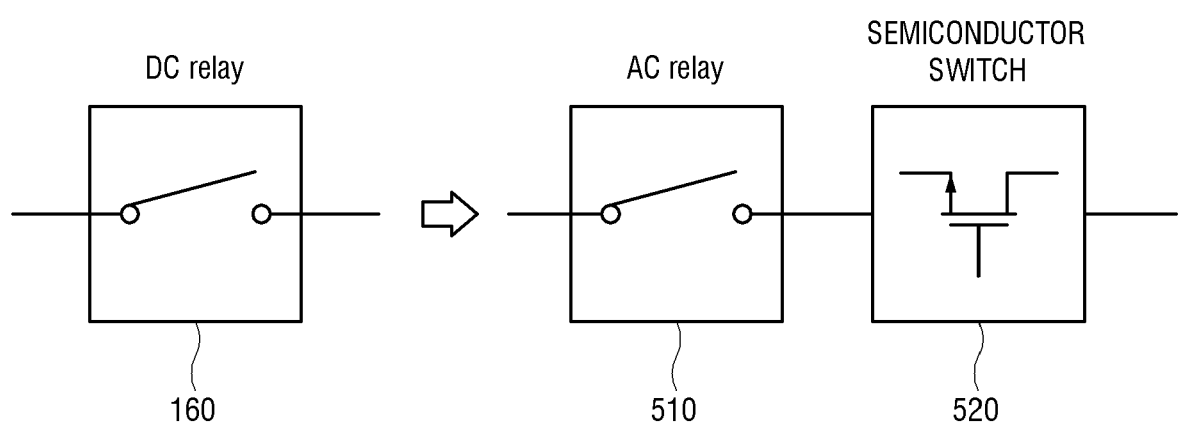
FIG. 13 illustrates an example of a second switching unit in a display apparatus according to an embodiment of the disclosure.

FIG. 13 illustrates an example of a second switching unit in a display apparatus according to an embodiment of the disclosure.

In the display apparatus 10 according to an embodiment of the disclosure, the second switching unit 160 operating based on the second power, in other words, the DC power may be embodied by a relay device that has a spaced distance for insulation.

However, such a DC relay device is generally voluminous and expensive, and therefore the second switching unit 160 may, as shown in FIG. 13, be alternatively replaced by combination of an AC relay device 510 and a semiconductor switch 520.

In the case where the second switching unit 160 includes the AC relay device 510 and the semiconductor switch 520, the AC relay device 510 is first turned on and then the semiconductor switch 520 is connected after the AC relay device 510 is short-circuited for a predetermined period of time when the second power source is connected. Further, when the second power source is disconnected, the semiconductor switch 520 is first turned off and then the AC relay device 510 is turned off after the semiconductor switch 520 is kept open for a predetermined period of time.

Meanwhile, according to another embodiment of the disclosure, the display apparatus may not automatically detect the connection and disconnection of the second power source (i.e. OC power) based on the first switching unit 150, the second switching unit 160, and the selector 170, but include a manual switch (or physical switch) selectively connectable to one of the first power source and the second power source based on a user's selection.

Figure 14:
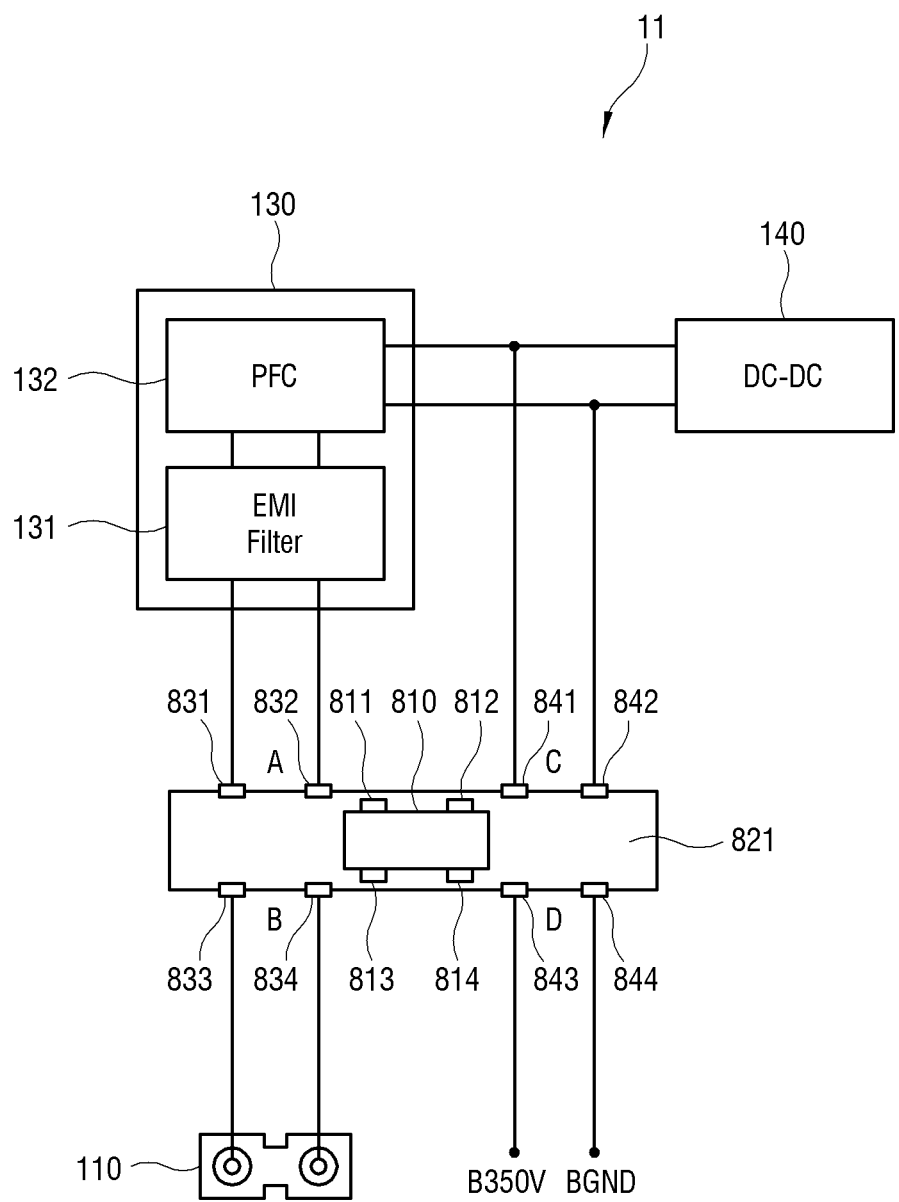
FIG. 14 illustrates a manual switch provided in a display apparatus according to another embodiment of the disclosure.
Figure 15:
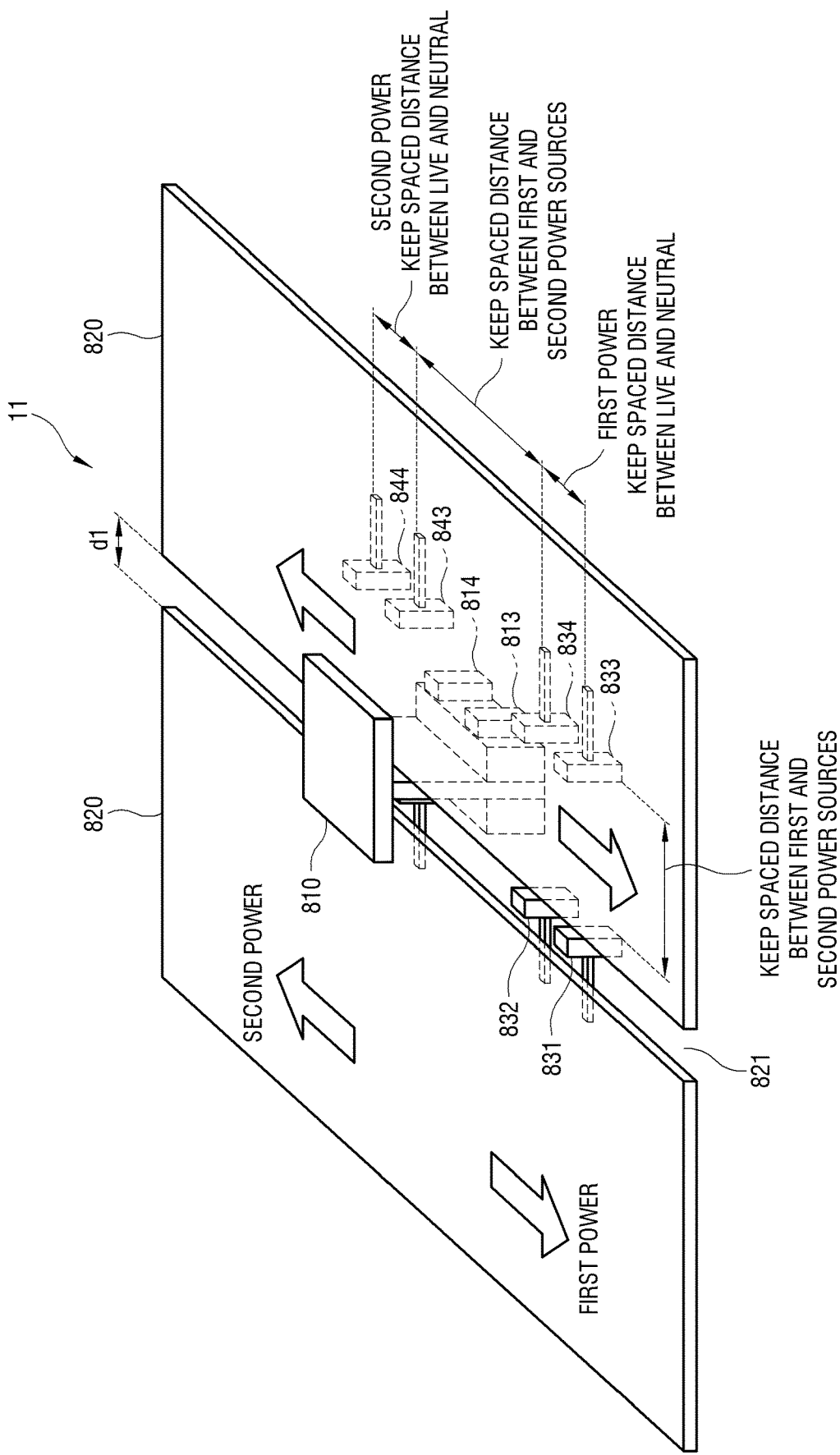
FIG. 15 illustrates an example of the manual switch in FIG. 14.
Figure 16:
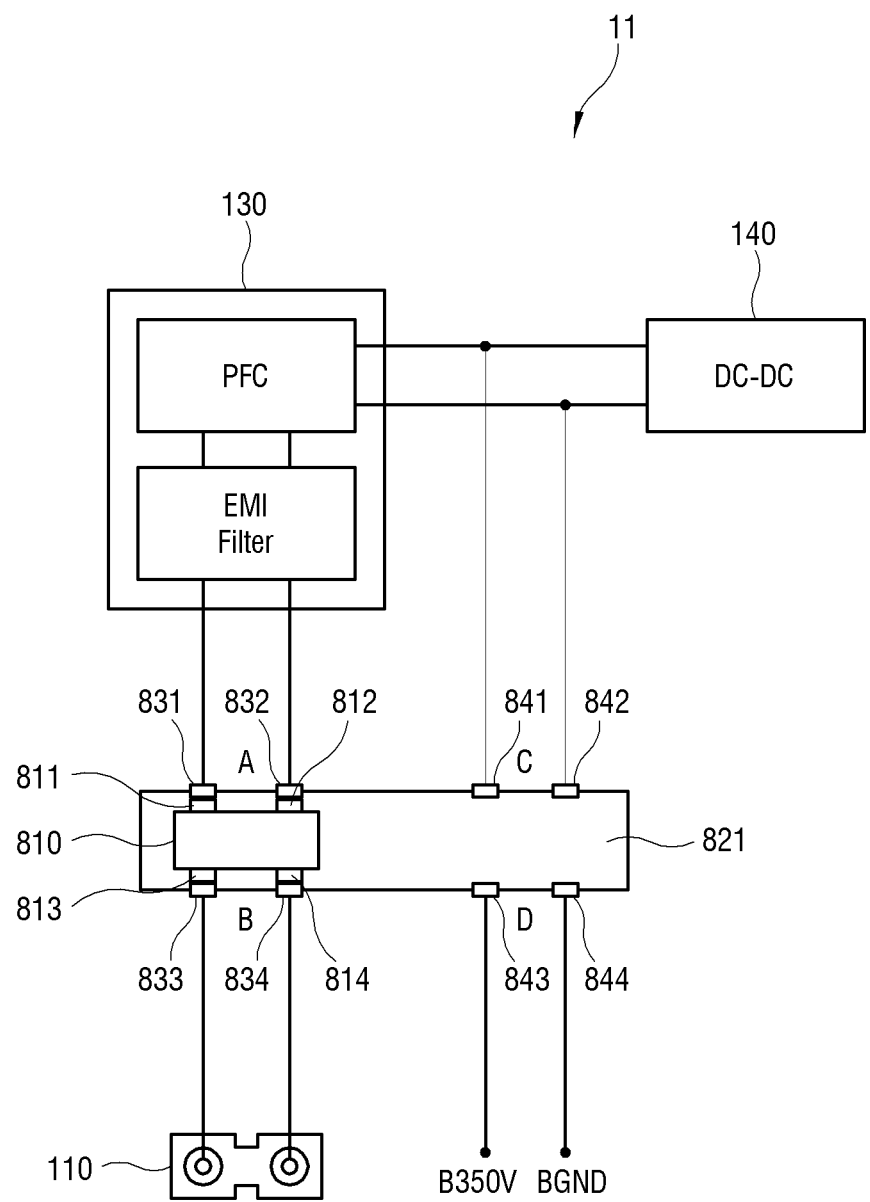
FIG. 16 illustrates connection with the first power source through the manual switch of FIG. 14.
Figure 17:
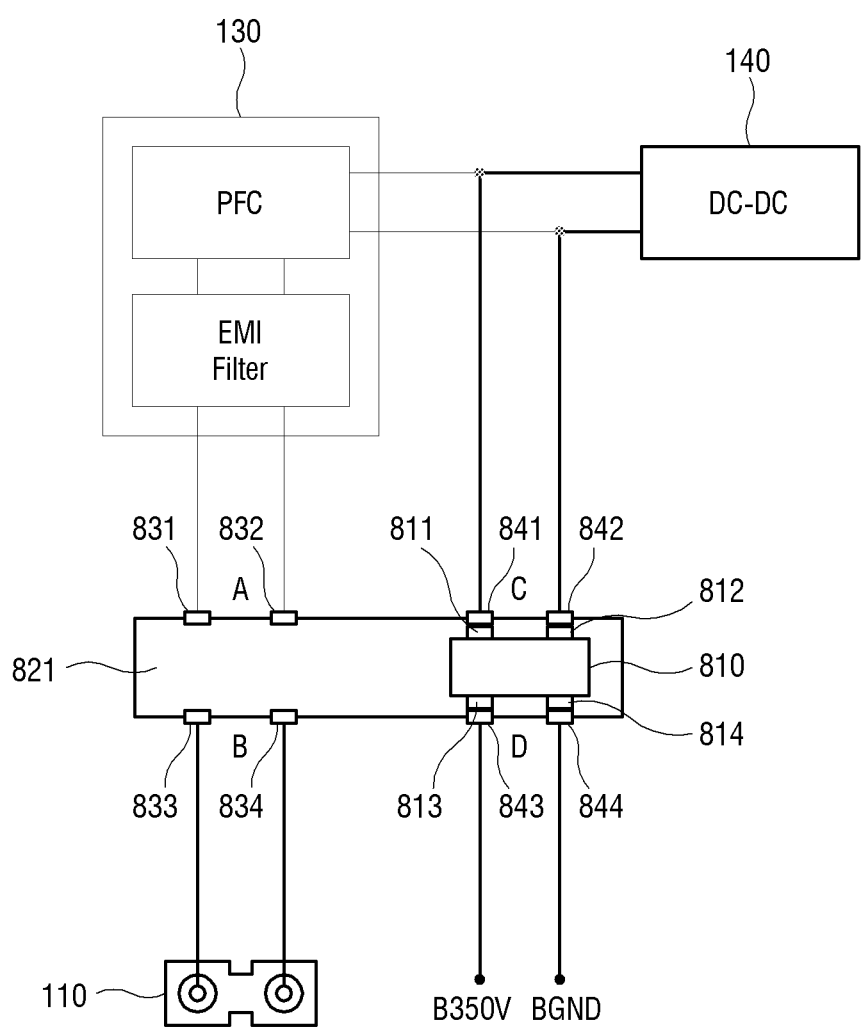
FIG. 17 illustrates connection with the second power source through the manual switch of FIG. 14.

FIG. 14 illustrates a manual switch provided in a display apparatus according to another embodiment of the disclosure, and FIG. 15 illustrates an example of the manual switch in FIG. 14. FIG. 16 illustrates connection with the first power source through the manual switch of FIG. 14, and FIG. 17 illustrates connection with the second power source through the manual switch of FIG. 14.

As shown in FIG. 14, a display apparatus 11 according to this embodiment of the disclosure may include a switch 810 selectively connectable to one of the first power source and the second power source based on a user's control.

The switch 810 may, as shown in FIG. 15, be embodied by a sliding switch that is movable between first contact points 831, 832, 833 and 834 for connection with the first power source provided in positions A and B and second contact points 841, 842, 843 and 844 for connection with the second power source provided in positions C and D of a sliding slit 821 formed in a certain portion of a cover member 820 forming an outer appearance of the display apparatus 11.

The switch 810 is provided with electrodes 811, 812, 813 and 814 connectable to the first contact points 831, 832, 833 and 834 or the second contact points 841, 842, 843 and 844 as the switch 810 slides and moves along the sliding slit 821.

As shown in FIG. 15, the sliding slit 821 is designed to have a safety distance d1 within a predetermined range to prevent insertion or reach of a human's hand and avoid an electric shock and the like dangerous things. Further, spaced distances are designed to be kept between the first contact points 811 and 812, between the second contact points 813 and 814, and between the first contact points 811 812 and the second contact points 813 and 814.

As shown in FIG. 16, when the switch 810 moves to the first power source, in other words, to the positions A and B, the electrodes 811, 812, 813 and 814 of the switch 810 are connected to the first contact points 831, 832, 833 and 834 of the corresponding positions, so that the display apparatus 11 can receive the first power (AC) through the first connector 110.

Here, the electrodes 811 and 812 connected to the first contact points 831 and 832 at the position A are placed on the route for the AC power, and may be designed to have a structure that the corresponding position is kept out of reach of a hand of a person who controls the switch 810 for safety.

Such first power source (AC) supplied through the first connector 110 is transferred to the first converter 130 through the switch 810, and subjected to noise removal and converted into DC power. The DC power is transferred from the first converter 130 to the second converter 140, converted by the second converter 140 to have levels required for the operations of the elements (e.g. the display 210, etc.) of the display apparatus 11, and supplied as the operation power to the corresponding elements.

As shown in FIG. 17, when the switch 810 moves to the second power source, in other words, to the positions C and D, the electrodes 811, 812, 813 and 814 of the switch 810 are connected to the second contact points 841, 842, 843 and 844 of the corresponding positions, so that the display apparatus 11 can receive the second power (DC, OC power) through the second connector 120.

Here, the electrodes 811 and 812 connected to the second contact points 841 and 842 at the position C has a ground voltage corresponding to an AC power source, and are designed to have a structure that the corresponding position is kept out of reach of a hand of a person who controls the switch 810 for safety by avoiding an electric shock and the like dangerous things. Further, the electrodes 813 and 814 connected to the second contact points 843 and 843 at the position D are placed corresponding to a high voltage (e.g. about 60V or higher) when the second power is applied, and may also be designed to have a structure that the corresponding position is kept out of reach of a hand of a person who controls the switch 810 for safety.

Such second power source (DC) supplied through the second connector 120 is transferred to the second converter 140 through the switch 810, converted by the second converter 140 to have levels required for the operations of the elements (e.g. the display 210, etc.) of the display apparatus 11, and supplied as the operation power to the corresponding elements.

According to this embodiment of the disclosure, the display apparatus 11 is selectively supplied with one of the first power and second power by a simple structure including the manual switch 810 that slides based on a user's control.

Meanwhile, according to still another embodiment of the disclosure, a display apparatus may employ a magnet-based manual switch without forming the sliding slit, and selectively connect with one of the first power source and the second power source based on a user's control.

Figure 18:
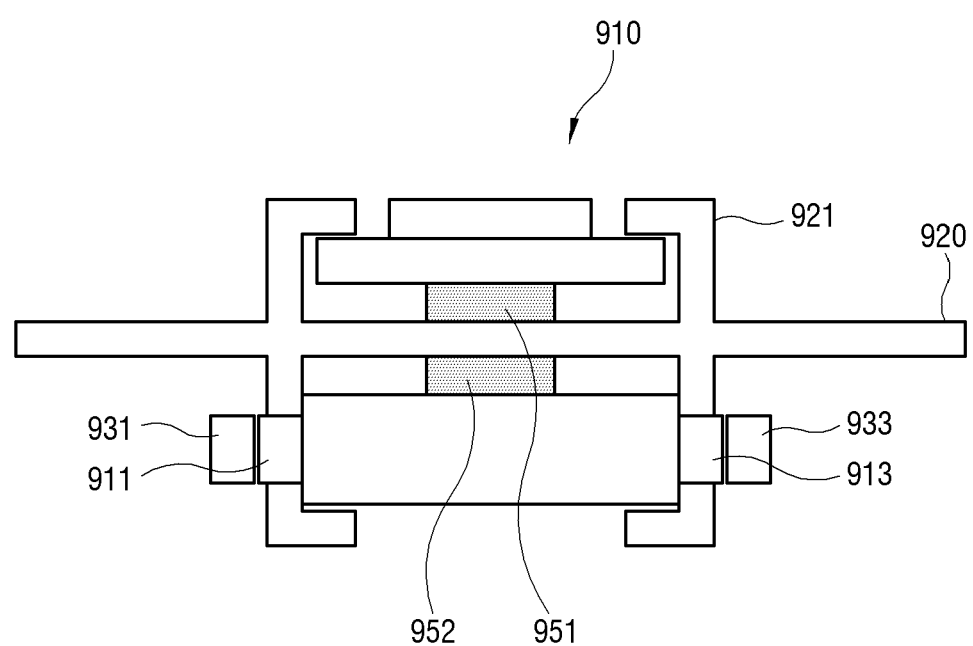
FIG. 18 is a front view of a manual switch provided in a display apparatus according to still another embodiment of the disclosure.
Figure 19:
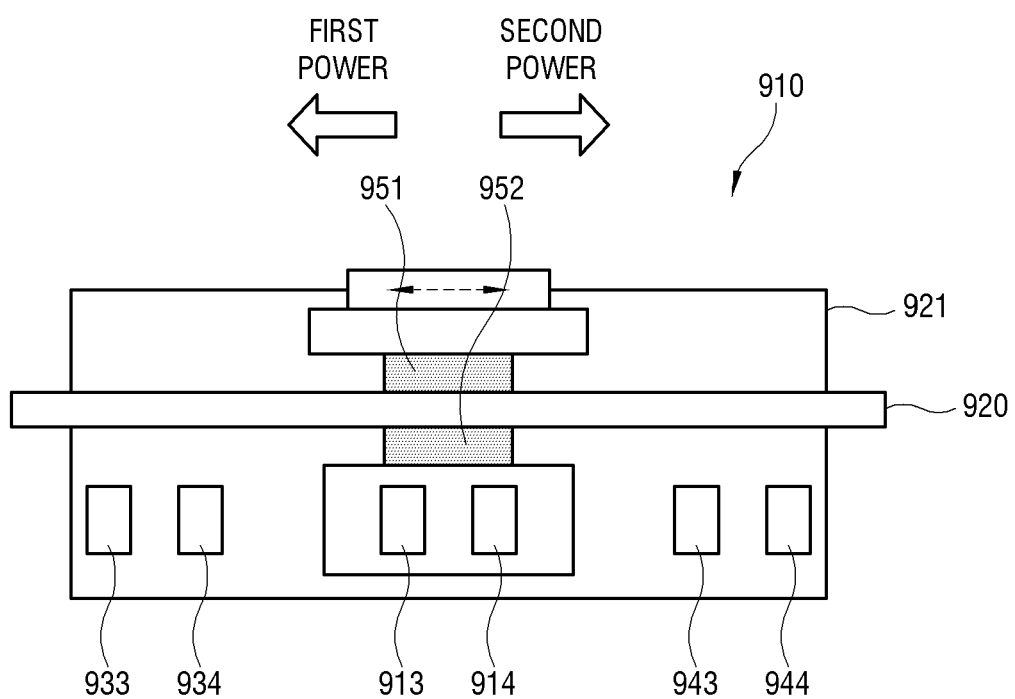
FIG. 19 is a lateral view of a manual switch provided in a display apparatus according to still another embodiment of the disclosure.

FIG. 18 is a front view of a manual switch provided in a display apparatus according to still another embodiment of the disclosure, and FIG. 19 is a lateral view of a manual switch provided in a display apparatus according to this embodiment of the disclosure. Here, FIGS. 18 and 19 respectively show the switch viewed from the front and the right side, with respect to FIG. 15.

As shown in FIG. 18, the display apparatus 11 according to still another embodiment of the disclosure may connect with one of the first power source and the second power source based on a user's control, and include a switch 910 including magnets 951 and 952.

The switch 910 may, as shown in FIGS. 18 and 19, include the magnets 951 and 952 provided on and beneath a cover member 920 forming the outer appearance of the display apparatus 11, and arranged to face with each other.

Like the switch 810 according to the embodiment shown in FIG. 14, the switch 910 may be embodied in the form of the sliding switch movable between first contact points 931, 932, 933 and 934 for connection with the first power source and the second contact points 941, 942, 943 and 944 for connection with the second power source. The cover member 920 may be provided with a guide 921 positioned corresponding to the sliding slit 821 of FIG. 14 and guiding the sliding of the switch 910.

The switch 910 is provided with electrodes 911, 912, 913 and 914 connectable to the first contact points 931, 932, 933 and 934 or the second contact point 941, 942, 943 and 944 as the switch 910 slides along the guide 921.

As described above, when the switch 910 including the magnets 951 and 952 is employed, the electrodes 911, 912, 913 and 914 are not exposed to the outside of the cover member 920, and there are no needs of the sliding slit for movement, thereby completely eliminating an electric shock and the like dangerousness to a human body while controlling the switch. Therefore, a user can select the first power source or the second power source for power supplied to the display apparatus 11 according to his/her own preferences under safer environments.

In the foregoing display apparatus according to the disclosure and the method of controlling the same, power is selectively supplied from one of a first power source installed on the wall and the second power source of a separate electronic apparatus, so that the display apparatus can be used alone or connecting with the electronic apparatus according to a user's preferences.

Further, according to the disclosure, the display apparatus can automatically switch over between the first power source and the second power source by detecting connection or disconnection of the second power source supplied through the electronic apparatus, and control a switching operation not to simultaneously receive both the first power and the second power in this process, thereby improving safety.

Further, according to the disclosure, the display apparatus is improved in convenience because the manual switch is provided to select the first power source or the second power source by a user's simple control.

Further, according to the disclosure, an electric shock and the like dangerousness to a human body during the control of the manual switch is eliminated, thereby providing a safe environment to a user.

Although a few exemplary embodiments have been shown and described, it will be appreciated that changes may be made in these exemplary embodiments without departing from the scope defined in the appended claims.

What is claimed is:

1. A display apparatus comprising:
   a display;
   a first connector connectable to a first power source which supplies an alternating current (AC) power;
   a second connector connectable to a second power source which supplies a first direct current (DC) power;
   a first converter configured to convert the AC power supplied from the first power source into a second DC power;
   a second converter configured to supply operation power to the display based on the second DC power converted by the first converter or the first DC power supplied from the second power source;
   a first switch and a second switch configured to perform selective connection between the first connector and the first converter and between the second connector and the second converter, respectively; and
   a selector configured to connect the first connector and the first converter or the second connector and the second converter based on a power connection state of the first connector and the second connector.

2. The display apparatus according to claim 1, wherein the selector controls the first switch and the second switch not to connect the first connector and the first converter, and the selector controls the first switch and the second switch to connect the second connector and the second converter based on a connection between the second connector and the second power source.

3. The display apparatus according to claim 1, wherein the selector controls the first switch and the second switch to operate with a period of time therebetween.

4. The display apparatus according to claim 2, wherein the selector comprises:
   a power generator configured to generate a voltage based on the connection between the second connector and the second power source; and
   an operator configured to control the first switch to be turned off and the second switch to be turned on based on the generation of the voltage.

5. The display apparatus according to claim 1, wherein the selector controls the first switch and the second switch not to connect the second connector and the second converter, and the selector controls the first switch and the second switch to connect the first connector and the first converter based on a disconnection between the second connector and the second power source.

6. The display apparatus according to claim 5, wherein the selector comprises:
   a detector configured to detect whether the first DC power of the second power source is lowered to a first level or below based on the disconnection between the second connector and the second power source; and
   an operator configured to control the second switch to be turned off and the first switch to be turned on based on the first DC power of the second power source being the first level or below.

7. The display apparatus according to claim 1, wherein each of the first switch and the second switch comprises a relay device.

8. The display apparatus according to claim 1, wherein the first DC power of the second power source is supplied from an electronic apparatus connected via the second connector.

9. A display apparatus comprising:
   a display;
   a first connector connectable to a first power source;
   a second connector connectable to a second power source;
   a first converter configured to convert a first power supplied from the first power source;
   a second converter configured to supply operation power to the display based on power converted by the first converter or a second power supplied from the second power source; and
   a switch movable between a first contact point for connection with the first power source and a second contact point for connection with the second power source, and movable between a third contact point for connection with the first connector and a fourth contact point for connection with the second connector, and configured to perform selective connection between the first connector and the first converter or between the second connector and the second converter based on a position of the switch.

10. The display apparatus according to claim 9, wherein the switch comprises an electrode connectable with the first contact point or the second contact point.

11. The display apparatus according to claim 9, wherein the switch is movable along a sliding slit provided in a cover member forming an outer appearance of the display apparatus.

12. The display apparatus according to claim 9, wherein the switch comprises magnets provided on and beneath a cover member forming an outer appearance of the display apparatus and arranged to face with each other, and is movable along a guide provided in the cover member.

13. A method of controlling a display apparatus having a first connector connectable with a first power source and a second connector connectable with a second power source, comprising:
   connecting the second connector and the second power source, which supplies direct current (DC) power;
   turning off a first switch for connection of the first connector after the second connector is connected to the second power source, the first switch being configured to selectively connect with the first power source, which supplies alternating current (AC) power; and
   turning on a second switch for connection of the second connector, the second switch being configured to selectively connect with second power source.

14. The method according to claim 13, wherein the turning on the second switch comprises turning on the second switch based on a lapse of a period of time after turning off the first switch.

15. The method according to claim 13, further comprising supplying operation power for the display apparatus, based on power supplied from the second power source.

16. The method according to claim 13, further comprising:
   disconnecting the second connector from the second power source;
   turning off the second switch for the connection of the second connector based on the disconnection; and
   turning on the first switch for the connection of the first connector.

17. The method according to claim 16, wherein the turning on the first switch comprises turning on the first switch based on a lapse of a predetermined period of time after turning off the second switch.

18. The method according to claim 13, further comprising receiving the power of the second power source from an electronic apparatus connected via the second connector.

19. The method according to claim 18, further comprising:
- converting power supplied from the first power source into the DC power; and
- supplying operation power for the display apparatus, based on the DC power.

20. The display apparatus according to claim 1, further comprising:
- a receiver configured to receive content from an external electronic device to be displayed on the display,
- wherein the second power is received from the same external electronic device from which the content is received.

21. The display apparatus according to claim 1, wherein the second converter is further configured to supply the operation power to the display based on the first power converted by the first converter in a first mode and configured to supply the second power supplied from the second power source in a second mode.

22. The display apparatus according to claim 1, wherein the first switch and the second switch are movable along a sliding slit provided in a cover member of the display apparatus.

* * * * *